(12) United States Patent
Hubbs

(10) Patent No.: US 12,493,844 B2
(45) Date of Patent: Dec. 9, 2025

(54) INTERACTIVE MANAGEMENT SYSTEM

(71) Applicant: Melody Rae Hubbs, Richmond, KY (US)

(72) Inventor: Melody Rae Hubbs, Richmond, KY (US)

(*) Notice: Subject to any disclaimer, the term of this patent is extended or adjusted under 35 U.S.C. 154(b) by 88 days.

(21) Appl. No.: 18/464,587

(22) Filed: Sep. 11, 2023

(65) Prior Publication Data

US 2024/0112288 A1    Apr. 4, 2024

Related U.S. Application Data

(60) Provisional application No. 63/368,111, filed on Jul. 11, 2022.

(51) Int. Cl.
| | | |
|---|---|---|
| *G06Q 10/0635* | (2023.01) | |
| *G06Q 50/26* | (2012.01) | |
| *G09B 7/00* | (2006.01) | |

(52) U.S. Cl.
CPC ....... *G06Q 10/0635* (2013.01); *G06Q 50/265* (2013.01); *G09B 7/00* (2013.01)

(58) Field of Classification Search
CPC ............. G06Q 10/063; G06Q 10/0635; G06Q 50/265; G09B 7/00
See application file for complete search history.

(56) References Cited

U.S. PATENT DOCUMENTS

| | | |
|---|---|---|
| 7,188,767 B2 | 3/2007 | Penuela et al. |
| 7,848,732 B2 | 12/2010 | Thomas |
| 8,011,224 B2 | 9/2011 | Kendler et al. |
| 8,743,356 B1 | 6/2014 | Mathieu et al. |
| 9,251,687 B2 | 2/2016 | Thompson et al. |
| 9,576,460 B2 | 2/2017 | Dayal |
| 9,892,616 B2 | 2/2018 | St. Germain et al. |
| 10,148,917 B2 | 12/2018 | Hegemann et al. |
| 10,154,401 B2 | 12/2018 | Olesen et al. |
| 10,955,810 B2 | 3/2021 | Boss et al. |

(Continued)

OTHER PUBLICATIONS

Luo, Xunrong, et al. "Quantifying hazard exposure using real-time location data of construction workforce and equipment." Journal of Construction Engineering and Management 142.8 (2016). (Year: 2016).*

*Primary Examiner* — William S Brockington, III
(74) *Attorney, Agent, or Firm* — Dunlap Bennett & Ludwig PLLC

(57) ABSTRACT

The present disclosure discloses a system that includes a transceiver and a processor. The transceiver may be configured to receive information associated with a facility. The processor may be communicatively coupled to the transceiver. The processor may be configured to obtain information from the transceiver, provide an interactive platform to train users and serve as a subject matter expert; determine a probability of a hazard based on the information, provide remediation recommendations, and generate a hazard report based on the determination of the probability of the hazard in the facility. Included is an Interactive Medical Reference System ("system") that includes an app for patients/doctors that operates on the same principle. The system aims to also take the place of trainers by being interactive thereby serving as a training tool and identify hazards or potentially detrimental healthcare treatment plans.

14 Claims, 44 Drawing Sheets

(56) References Cited

U.S. PATENT DOCUMENTS

| | | |
|---|---|---|
| 11,128,114 B2 | 9/2021 | Kralik et al. |
| 11,231,377 B2 | 1/2022 | Melton et al. |
| 2015/0077737 A1 | 3/2015 | Belinsky et al. |
| 2017/0075329 A1 | 3/2017 | Whittaker |
| 2018/0080846 A1 | 3/2018 | Zhang et al. |
| 2019/0109931 A1 | 4/2019 | Mercer |
| 2019/0385297 A1* | 12/2019 | Khosrowpour ........ G06N 20/00 |
| 2021/0109497 A1* | 4/2021 | Man ................... G06Q 10/0635 |
| 2021/0158207 A1* | 5/2021 | Alsahlawi .............. G06N 20/00 |
| 2022/0284566 A1* | 9/2022 | Starr ..................... G06V 20/52 |

* cited by examiner

NOTE: This software can be adjusted to assist Federal and State Governmental professionals (including entities such as the DOD which have their own more stringent standards), Building Code Inspectors, Hospital Inspectors Nursing Home Inspectors, Food Inspectors, Civil Engineering Inspectors, Insurance Auditors, and Construction Inspectors. The subject matter will change based on standards.
This software can also be tied into another software to enter data into designated database fields as applicable/upload the report.

This system can also listen and take notes which can be provided on the end report, and use the data to automatically fill out a database's appropriate fields and report. Personnel can access the report on the left hand menu or request the system to bring up the report to view it and fill it out, or ask the system a question on the report and the system can speak/display the information. Again, these are these are options that can be added on.

Start up screen asks: What is the name and address of the facility that you are surveying?

1

A blank editable field is provided below the question that has the option for location services to provide the company address or the user can either type in or the microphone can selected and the field can be entered with speech to text (for any field in the system).

2

If Private Industry is chosen, a drop down menu of Industry types is provided to be selected by the user

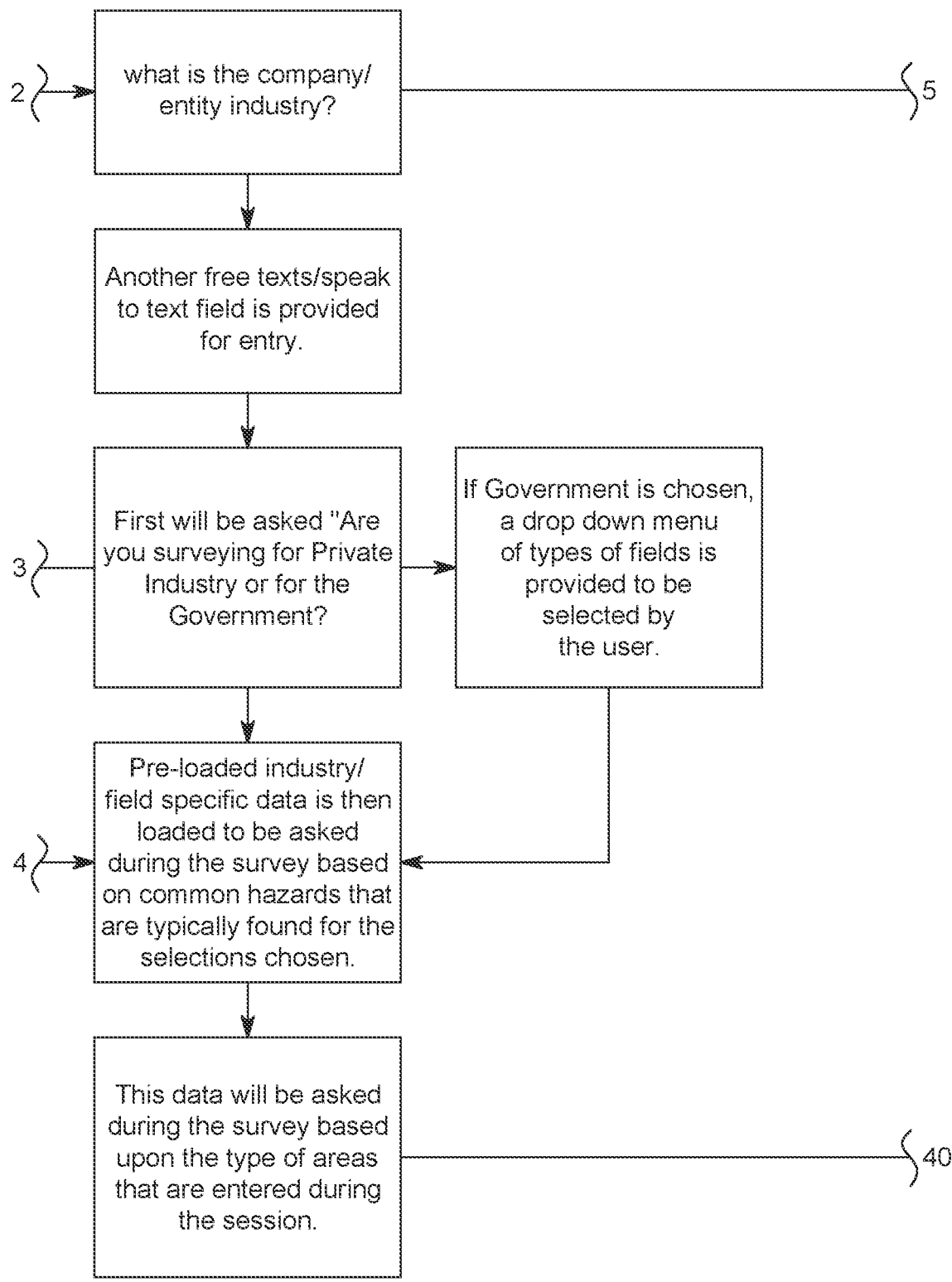
FIG. 1.2

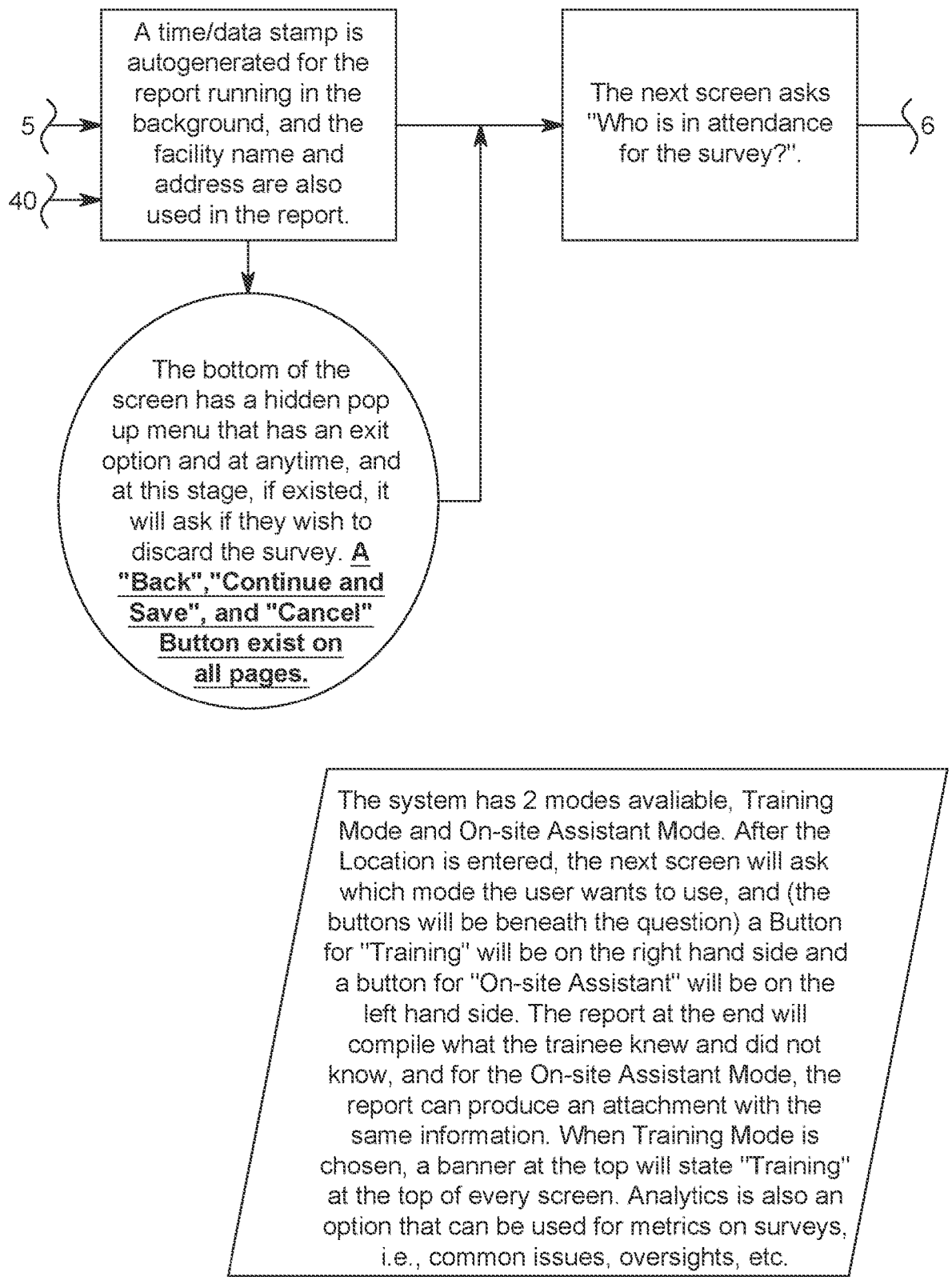
FIG. 1.3

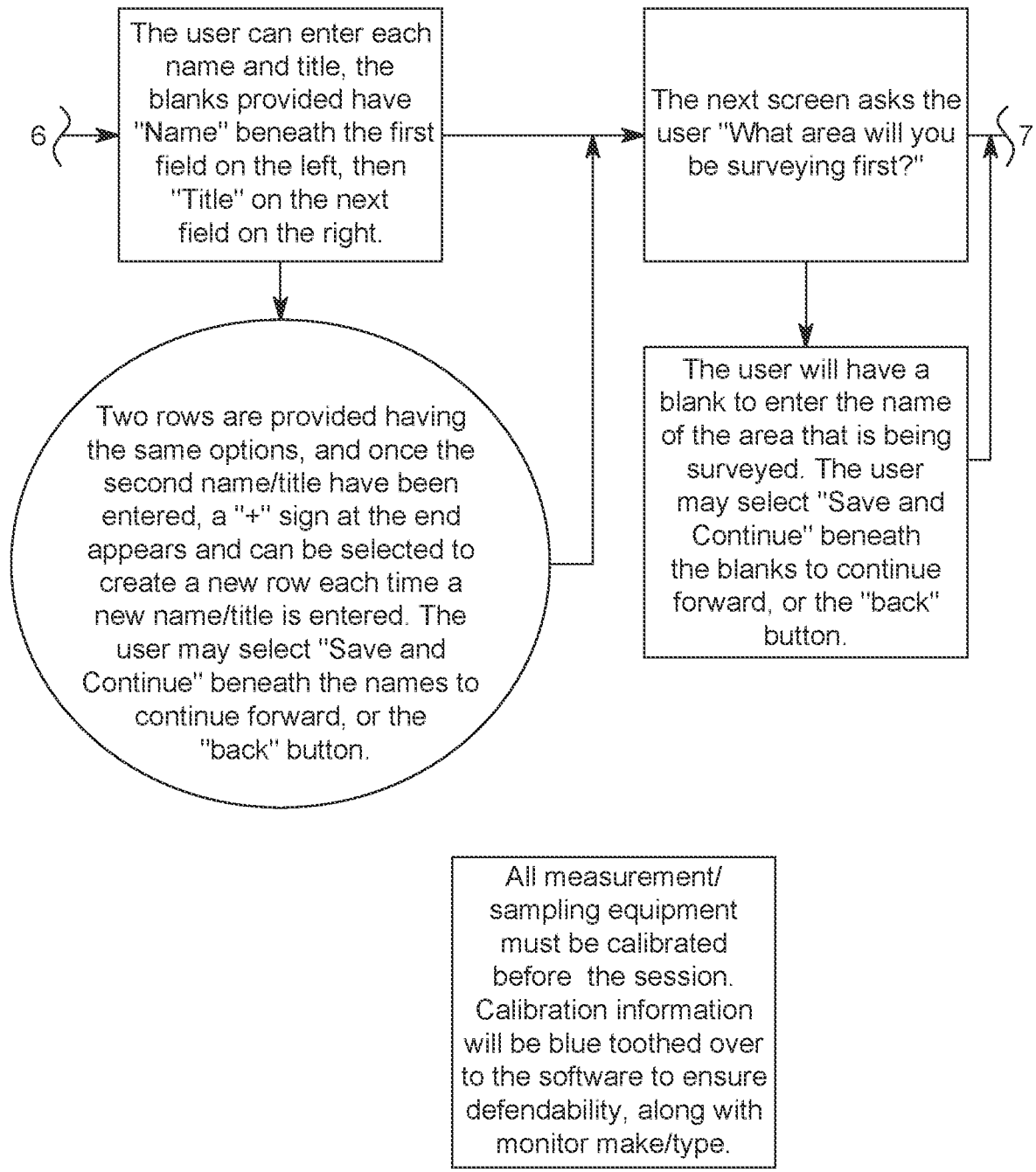
FIG. 1.4

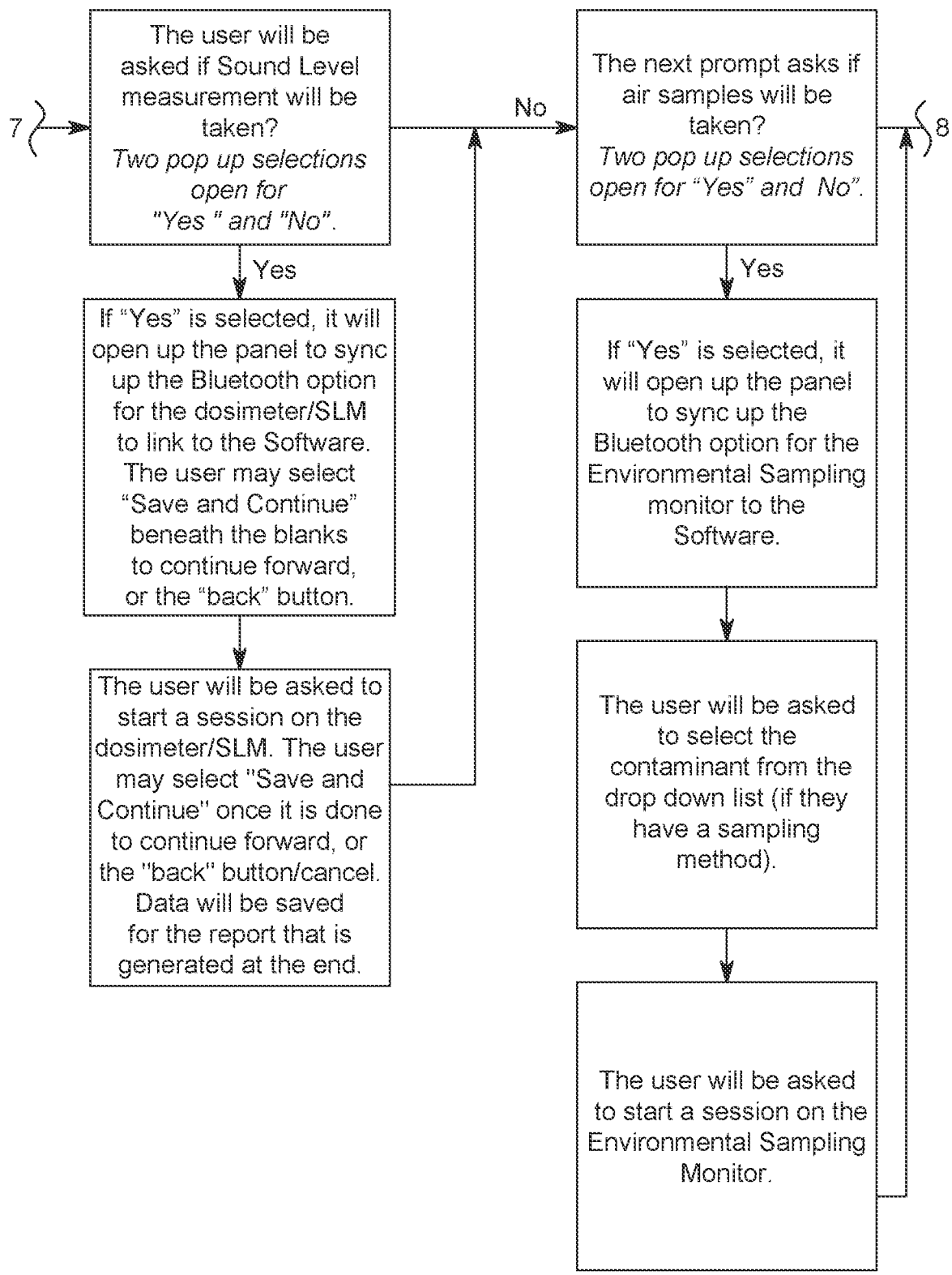
FIG. 1.5

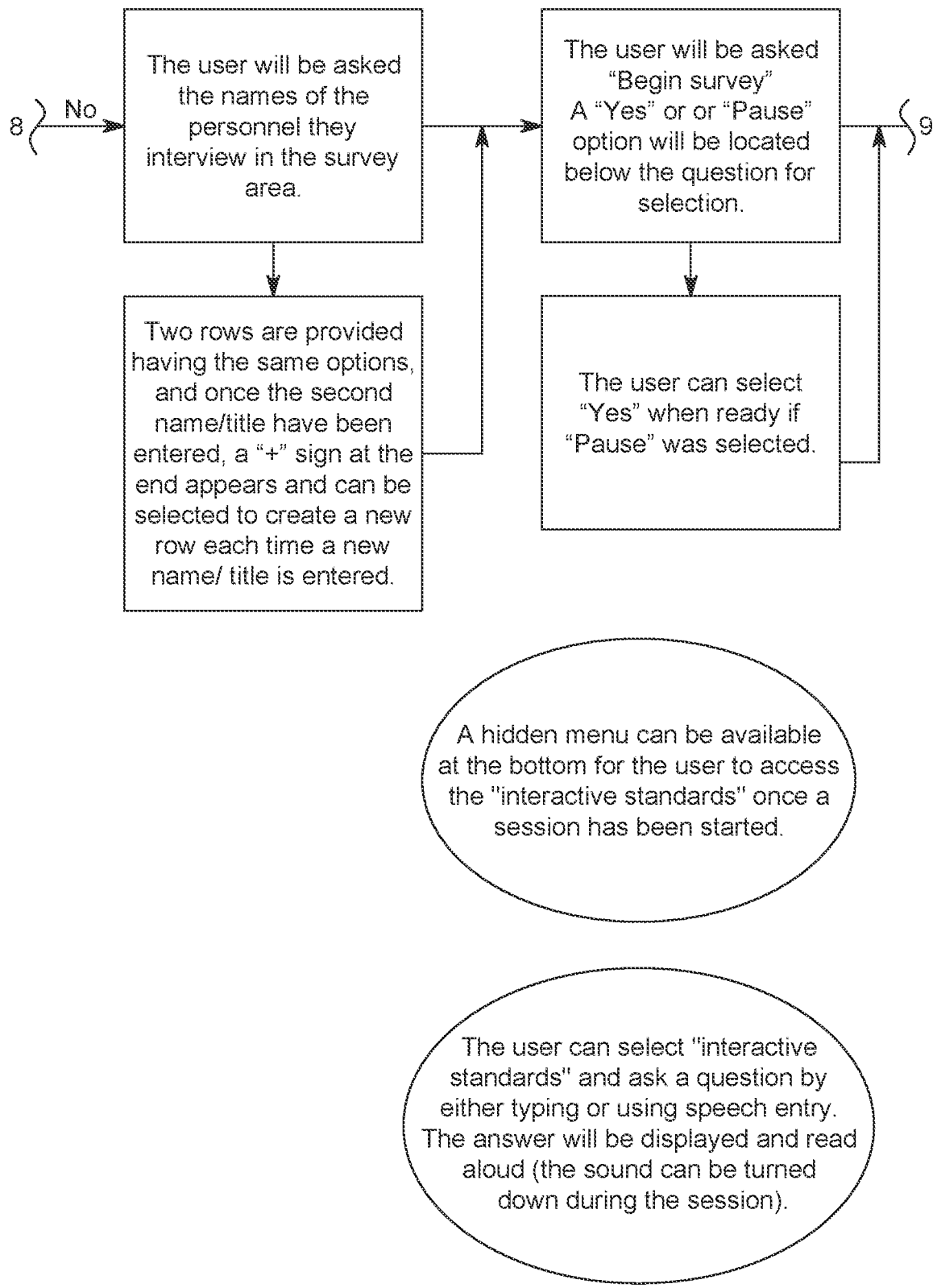
FIG. 1.6

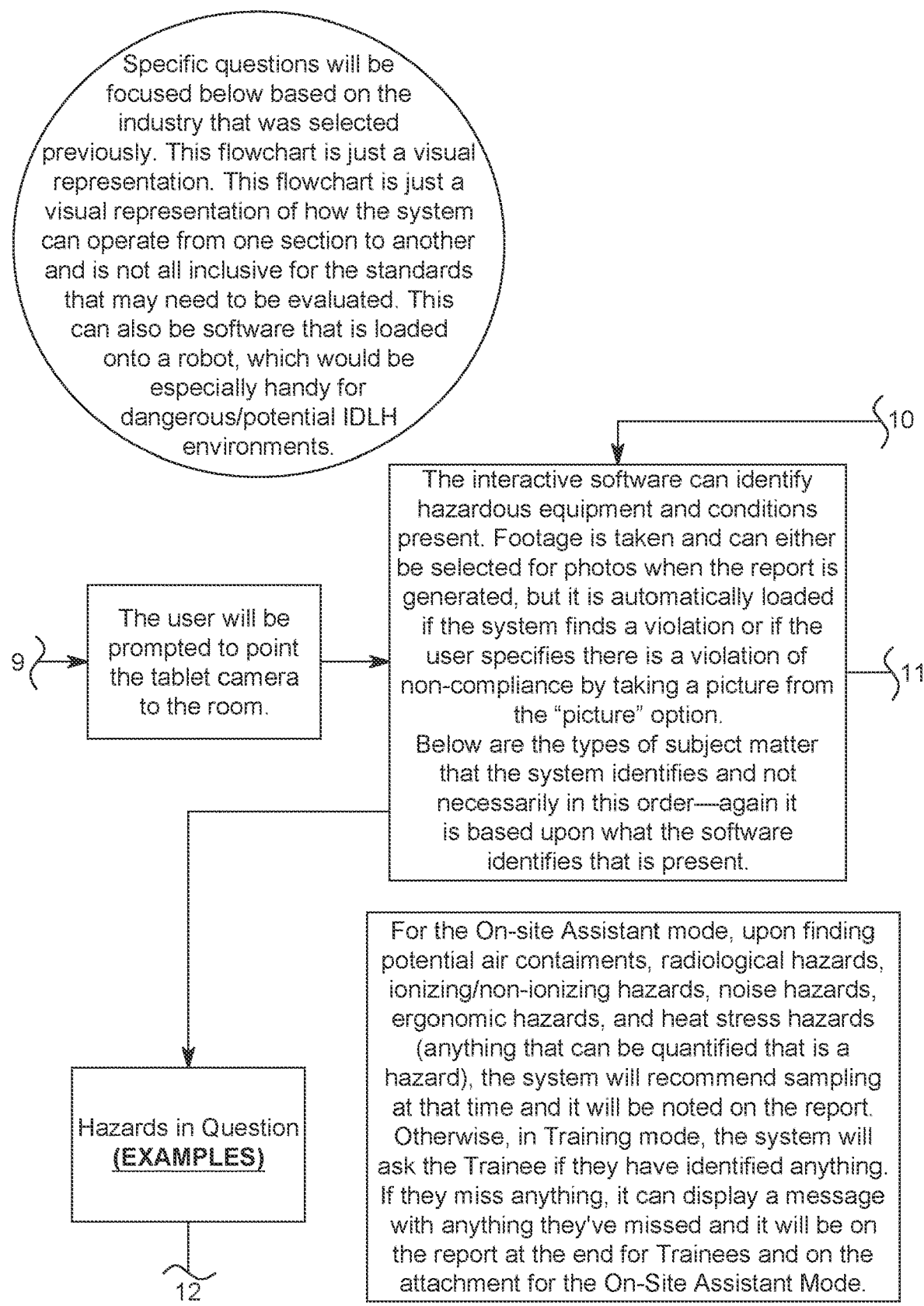
FIG. 1.7

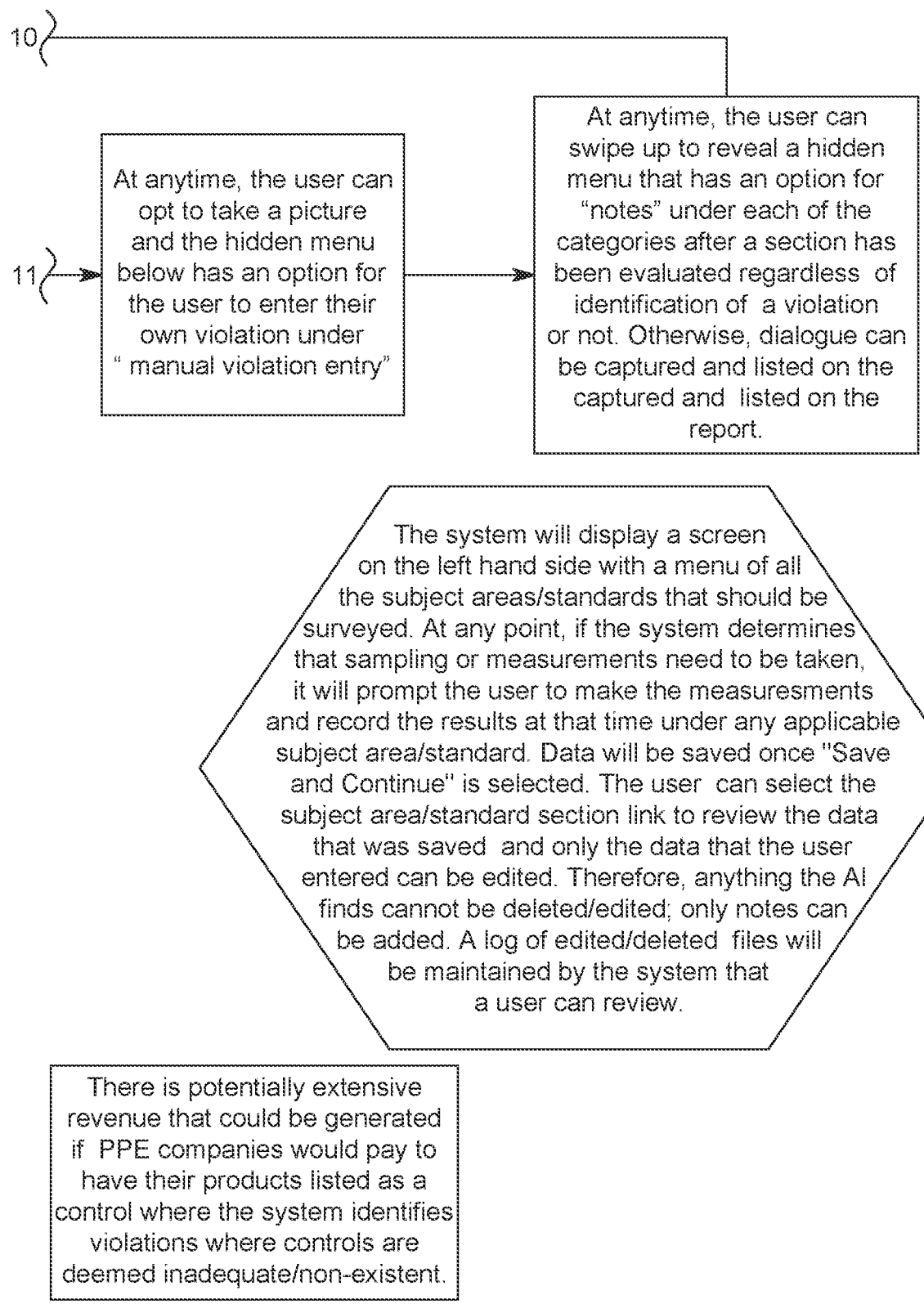
FIG. 1.8

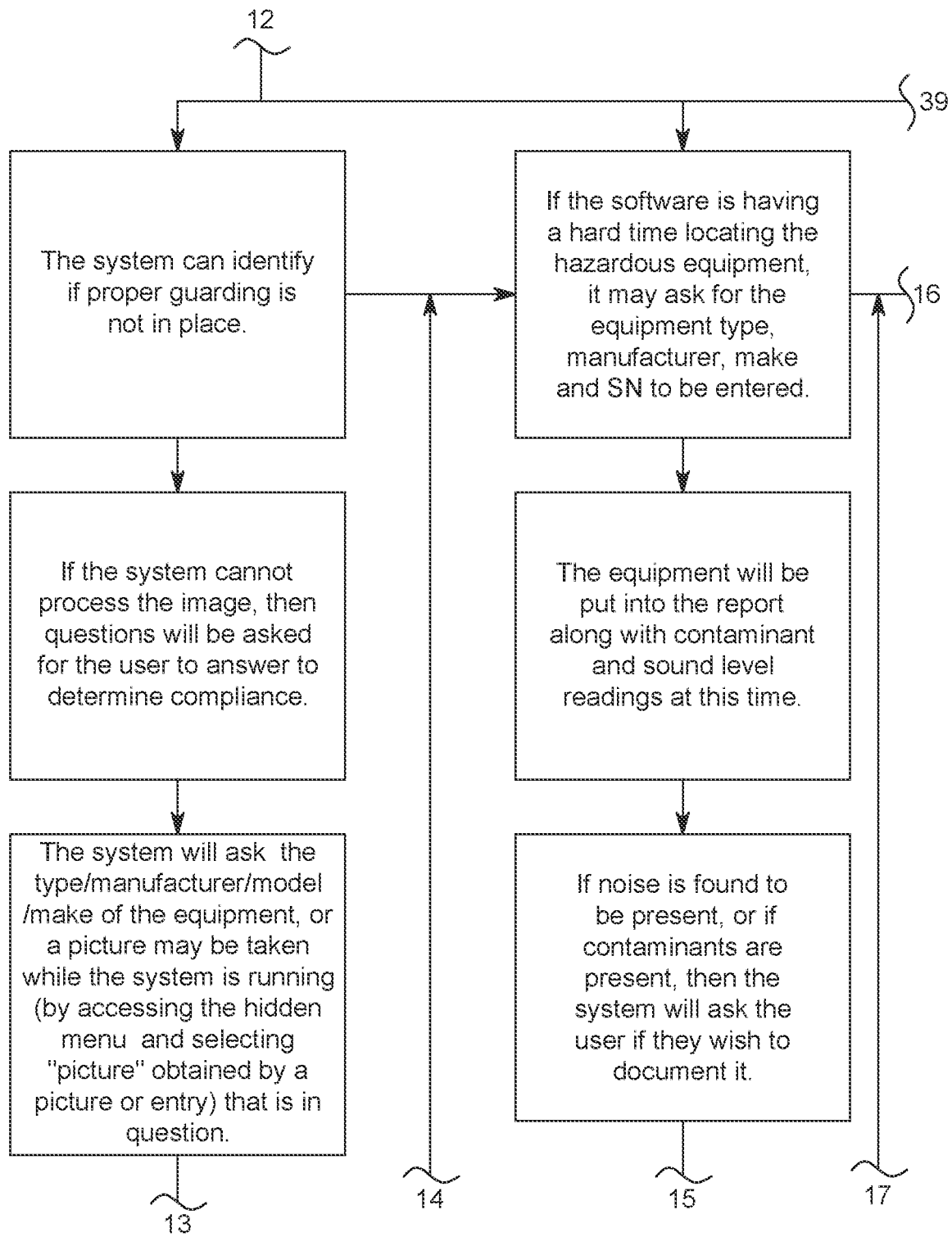
FIG. 1.9

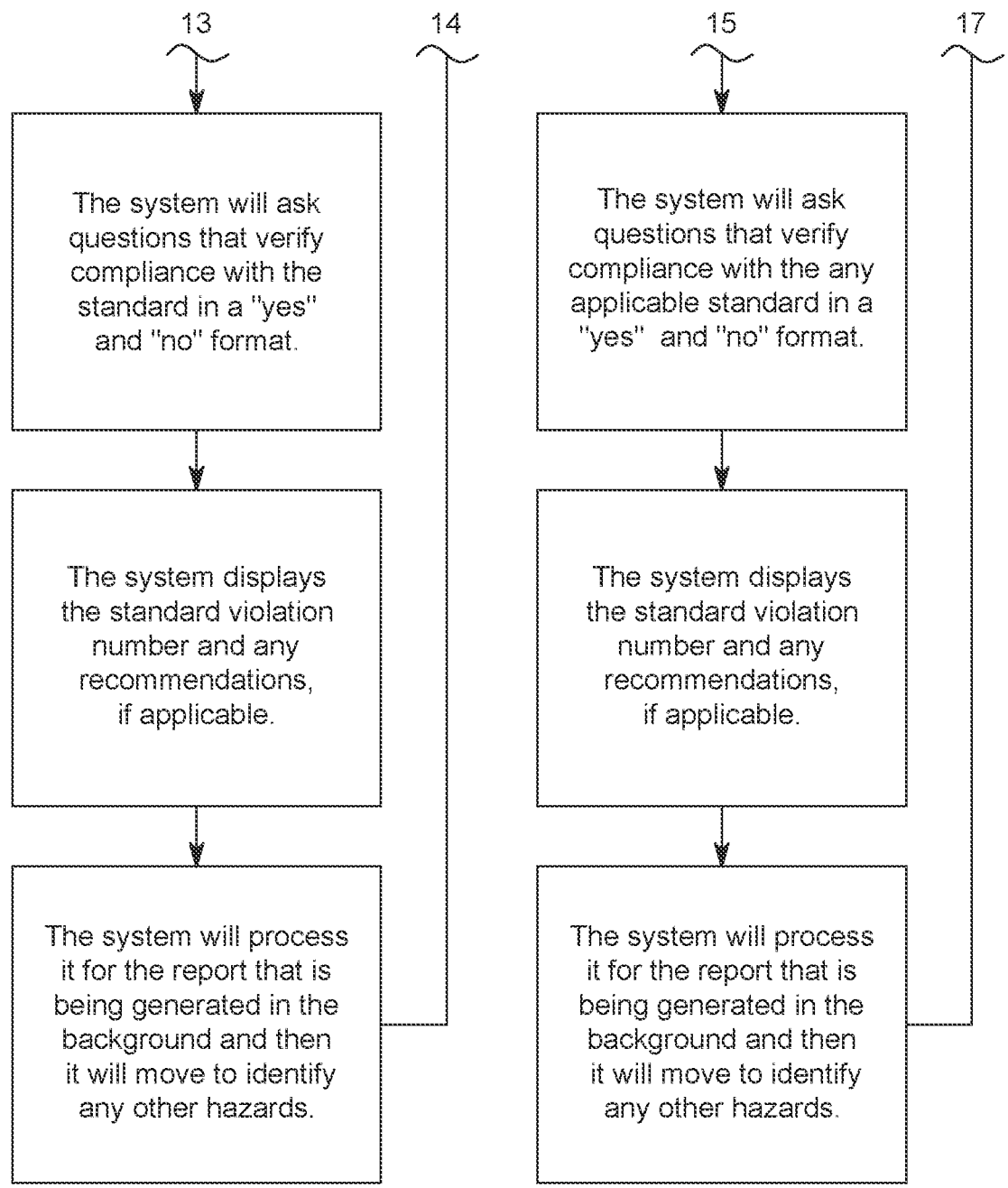
FIG. 1.10

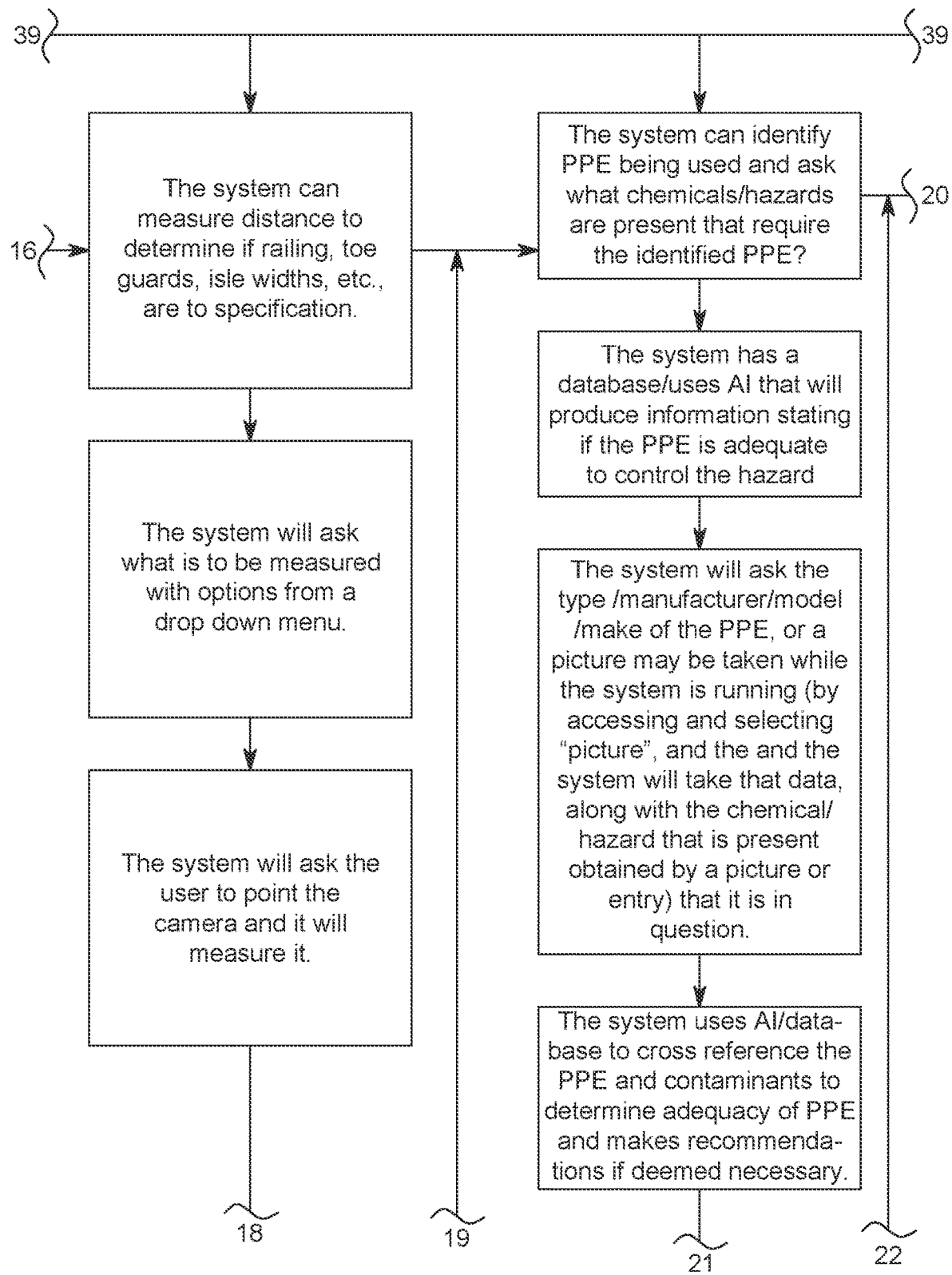
FIG. 1.11

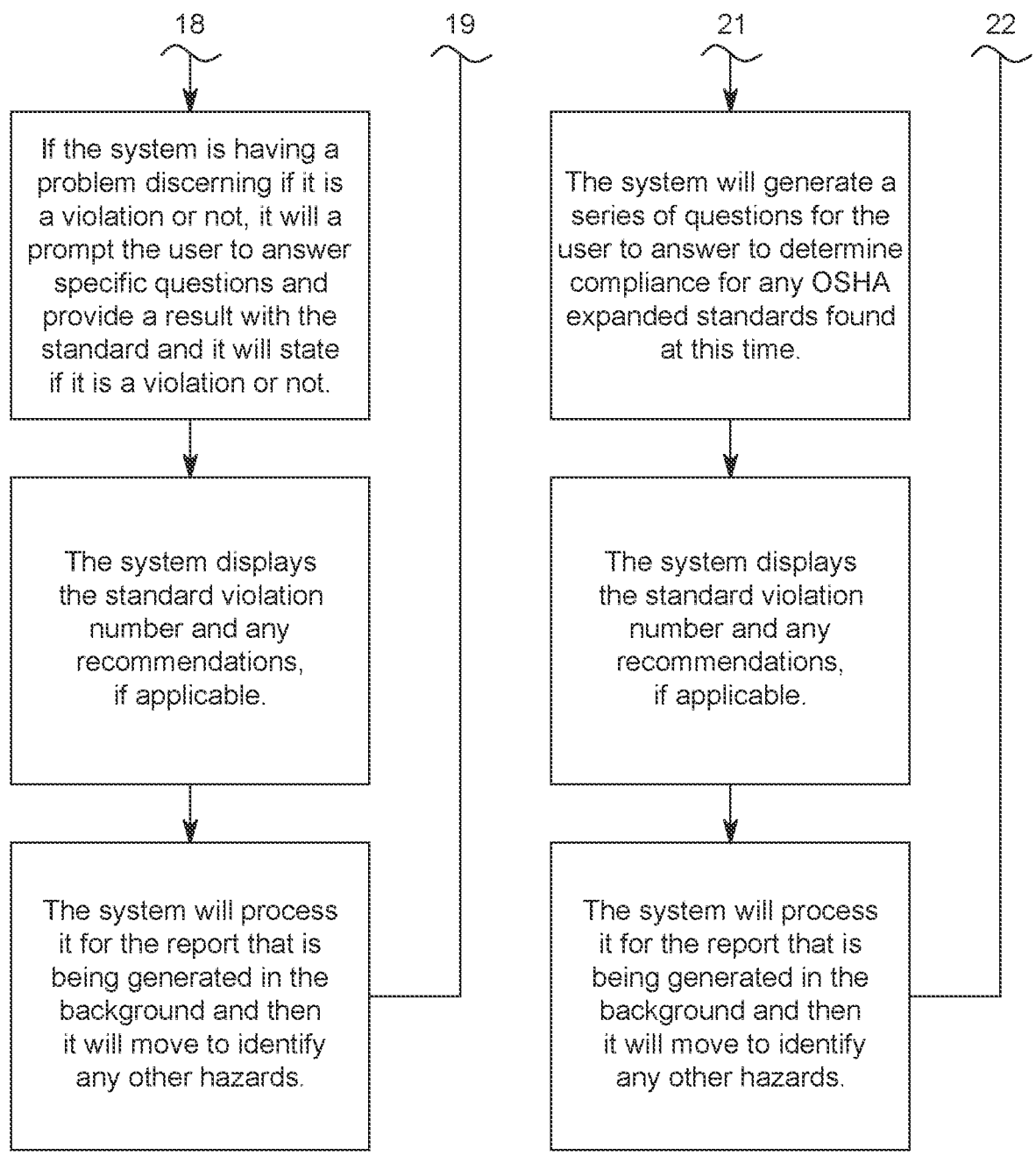
FIG. 1.12

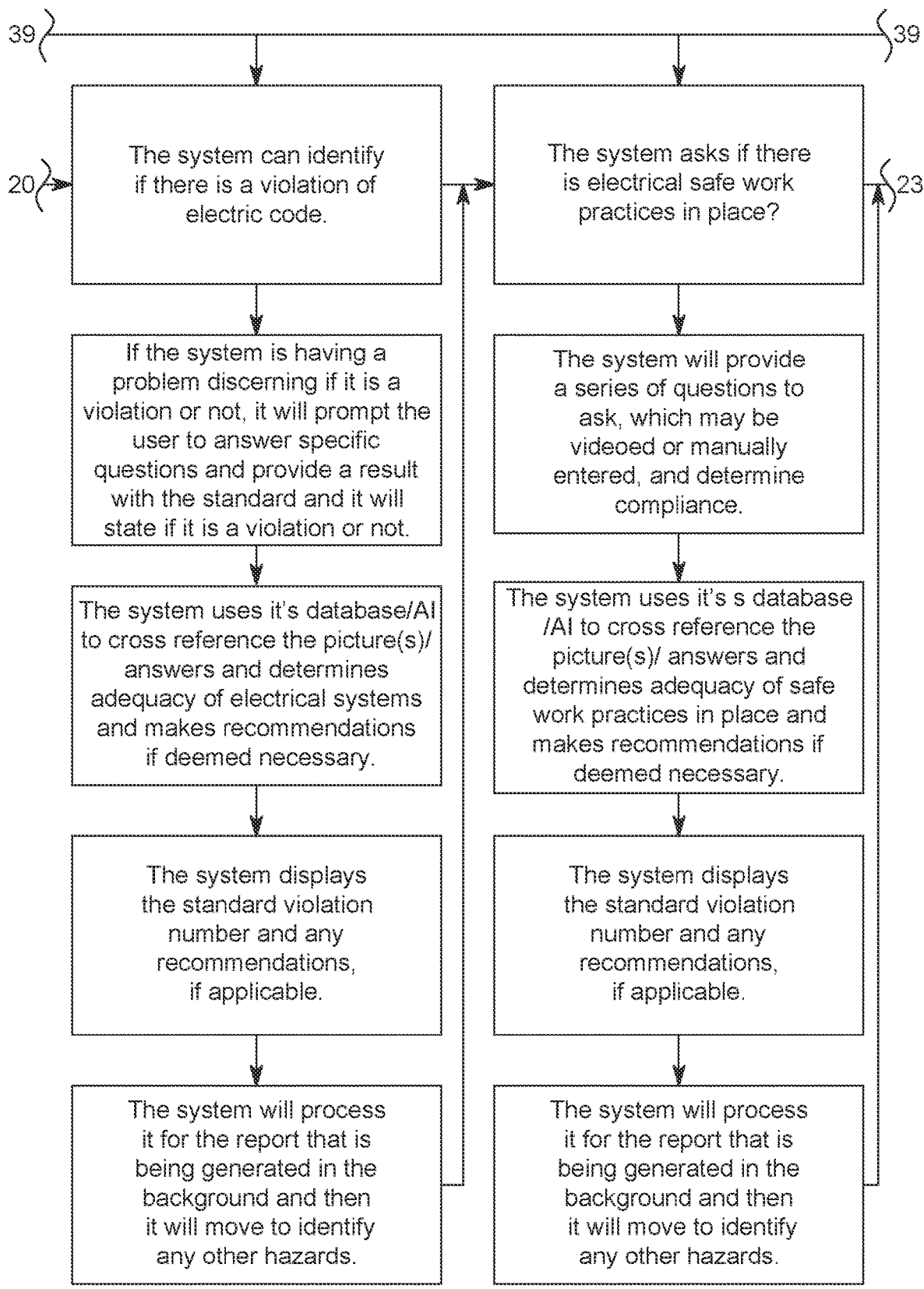
FIG. 1.13

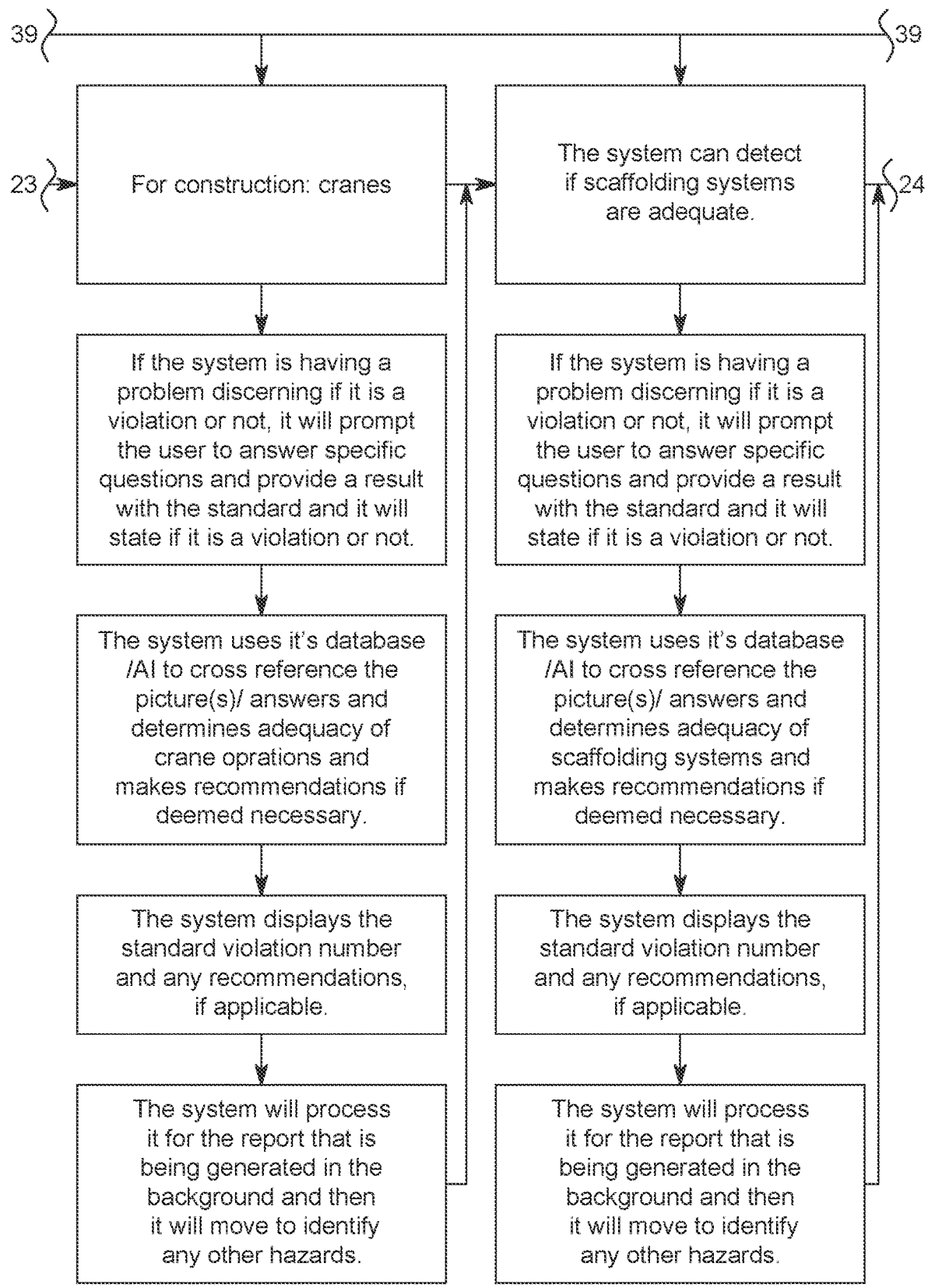
FIG. 1.14

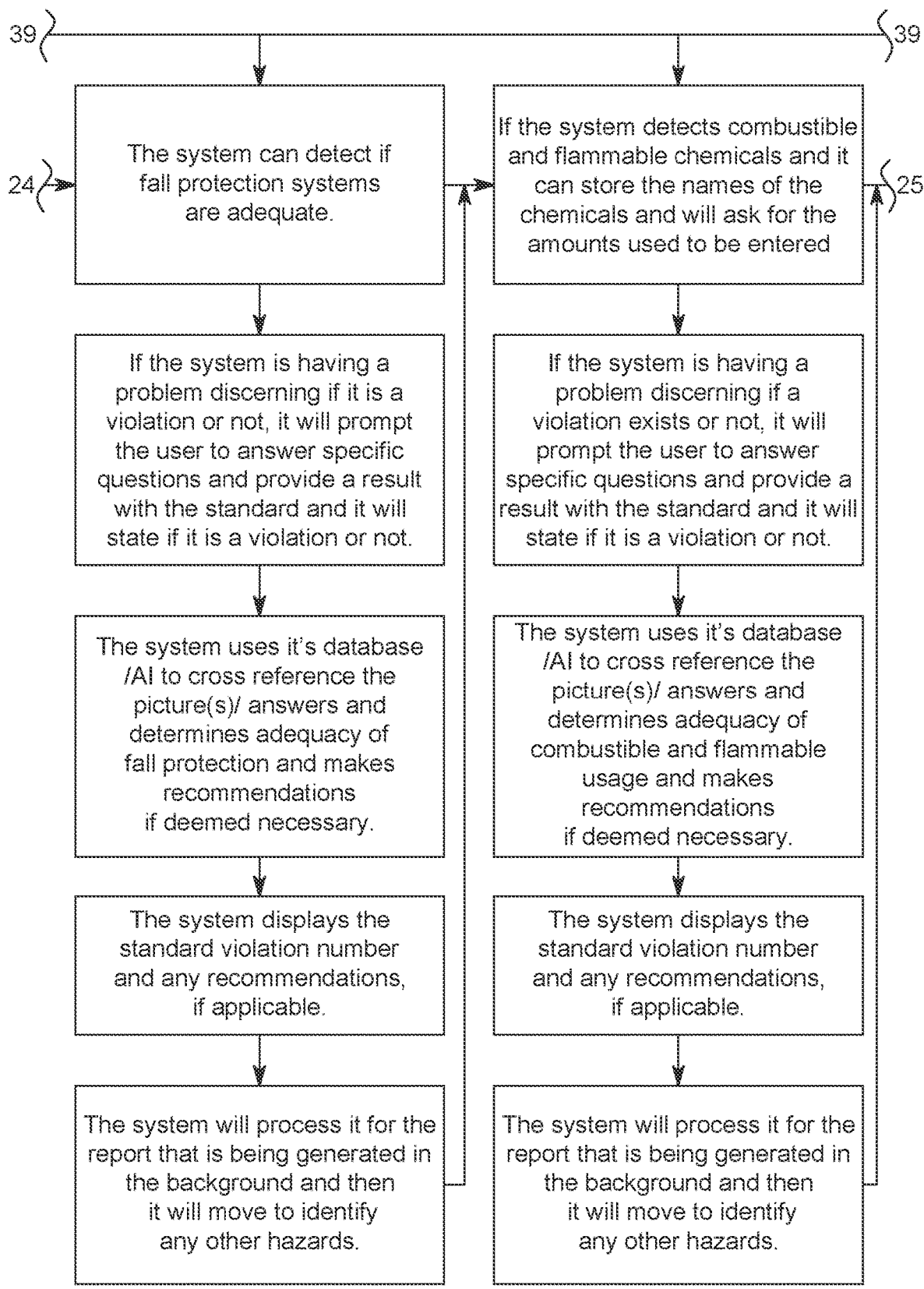
FIG. 1.15

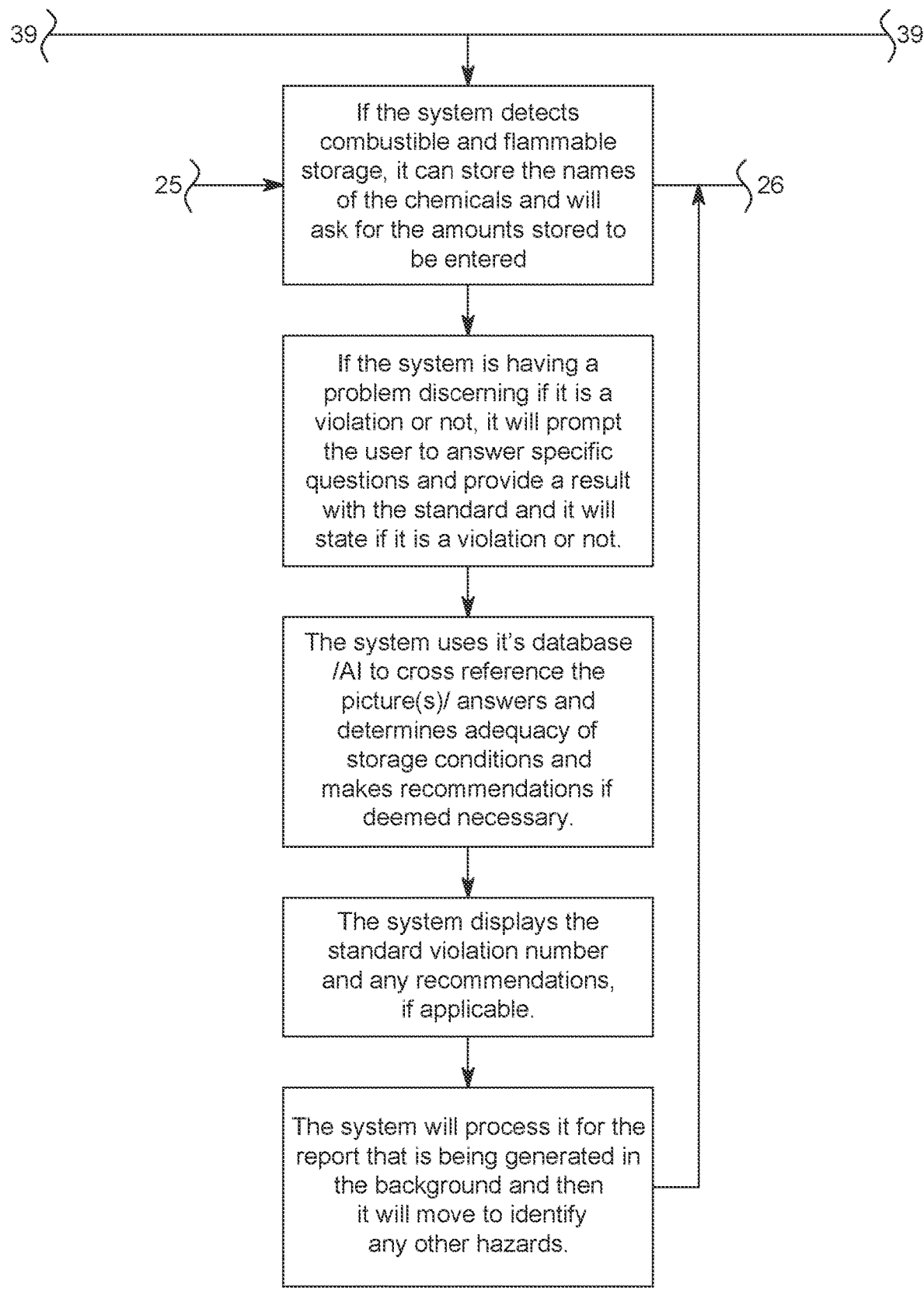
FIG. 1.16

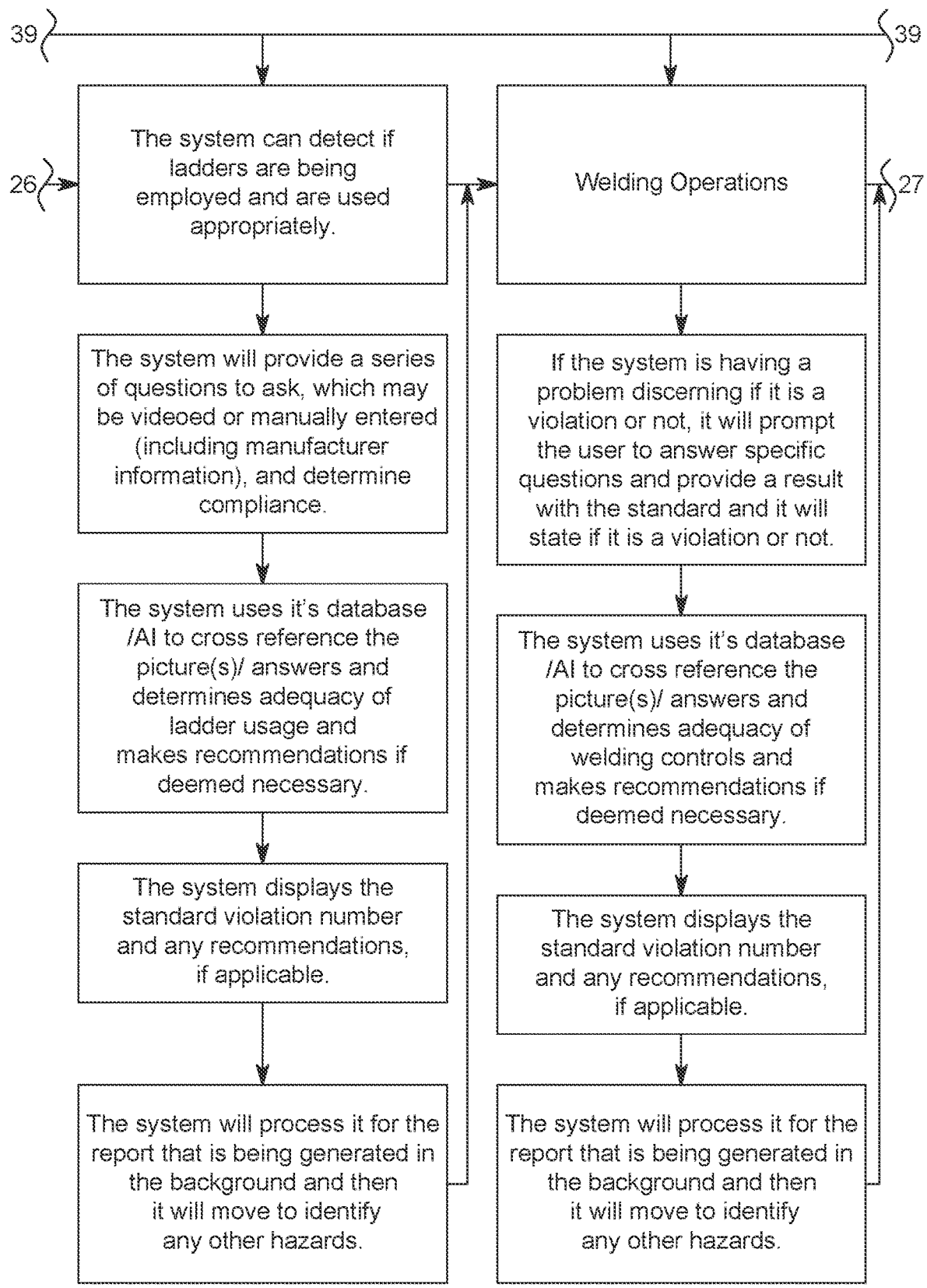
FIG. 1.17

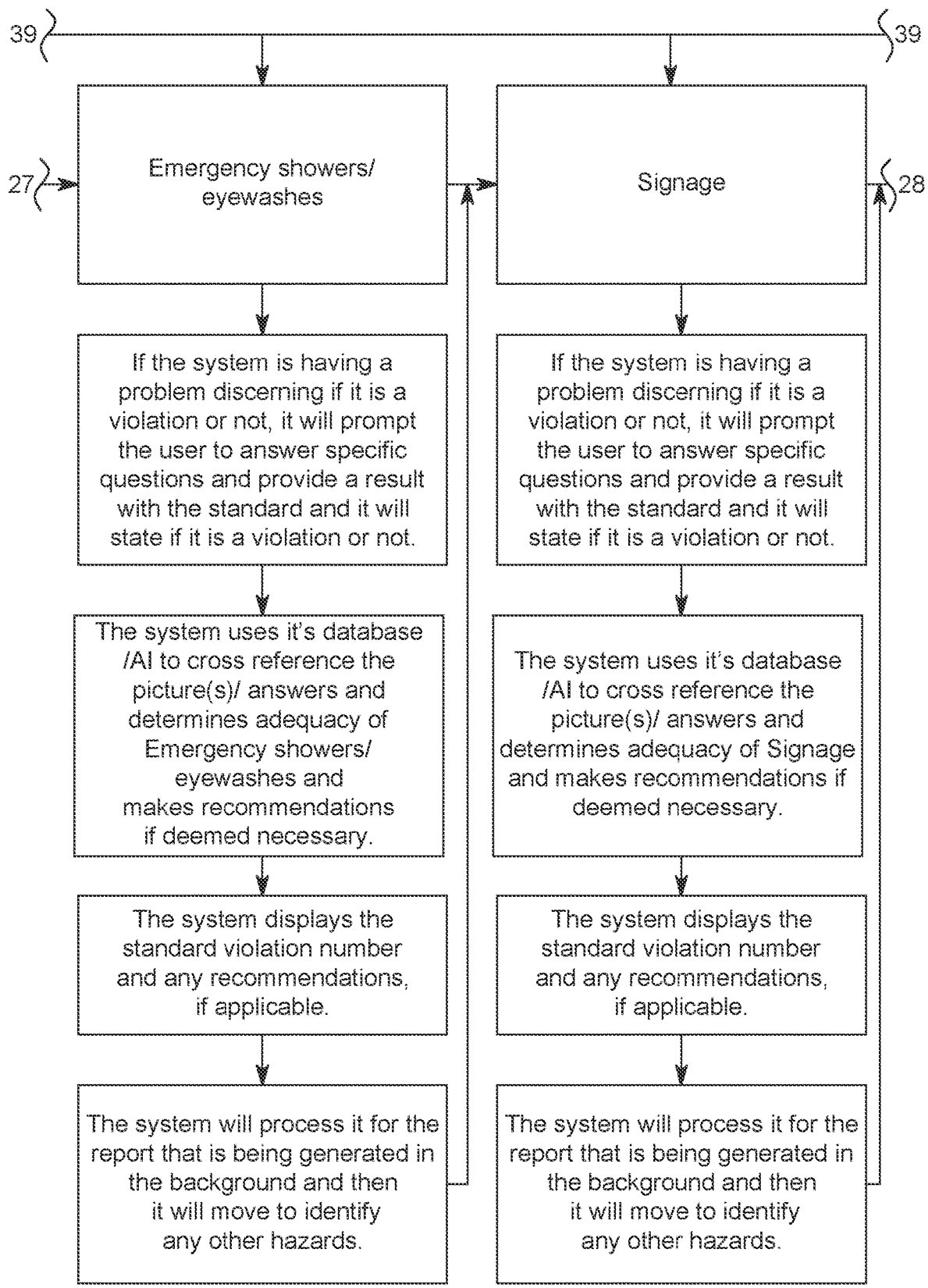
FIG. 1.18

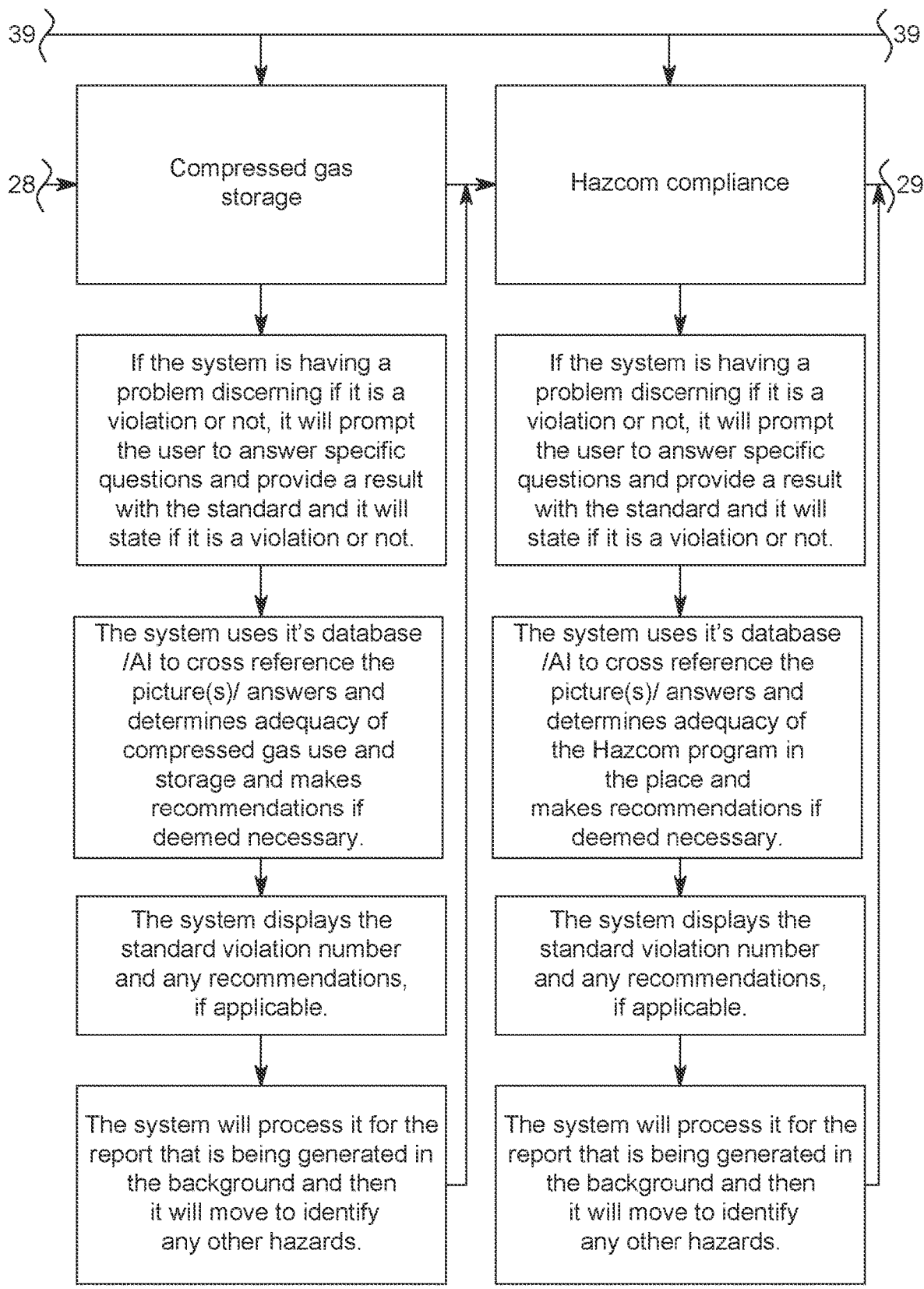
FIG. 1.19

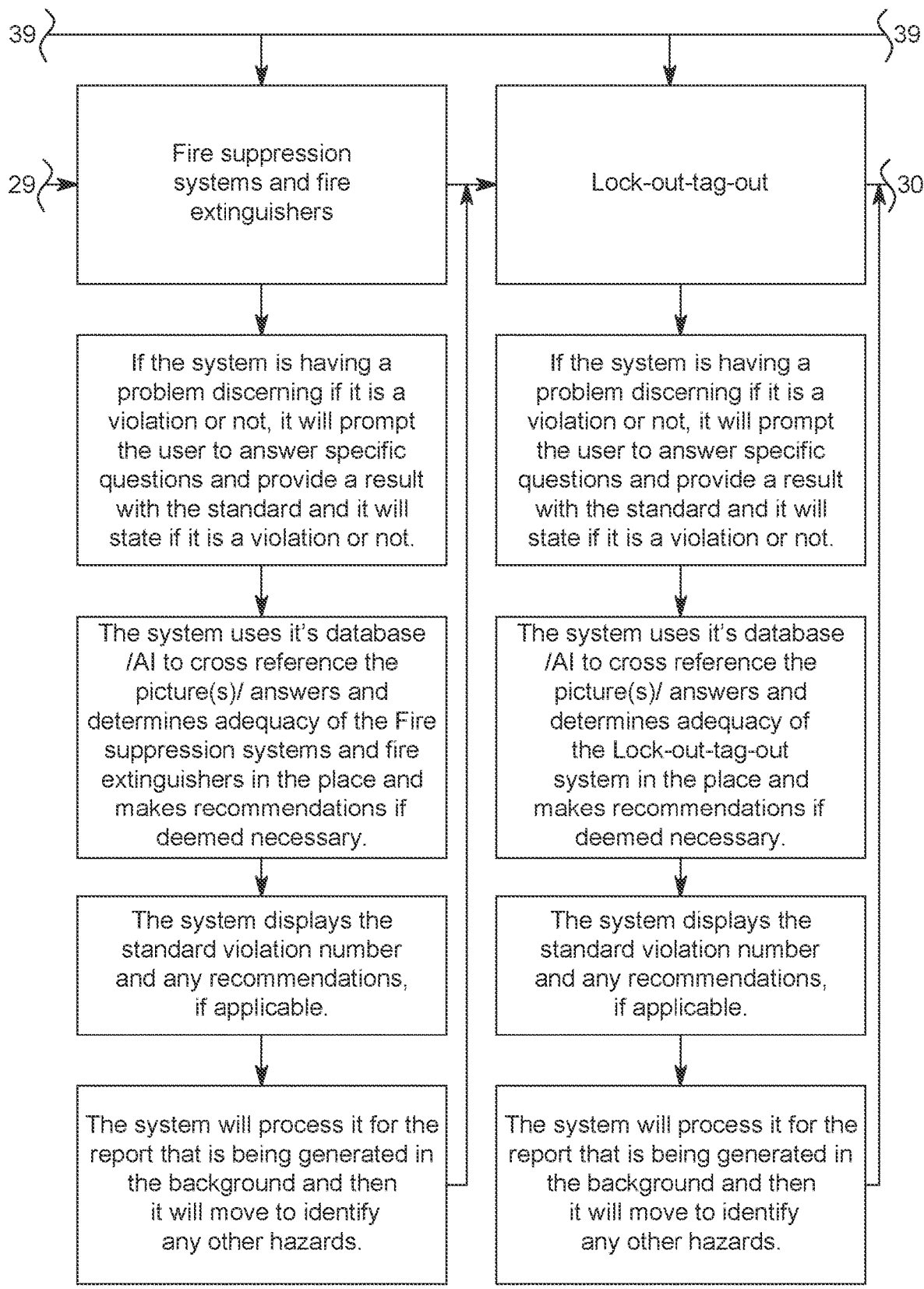
FIG. 1.20

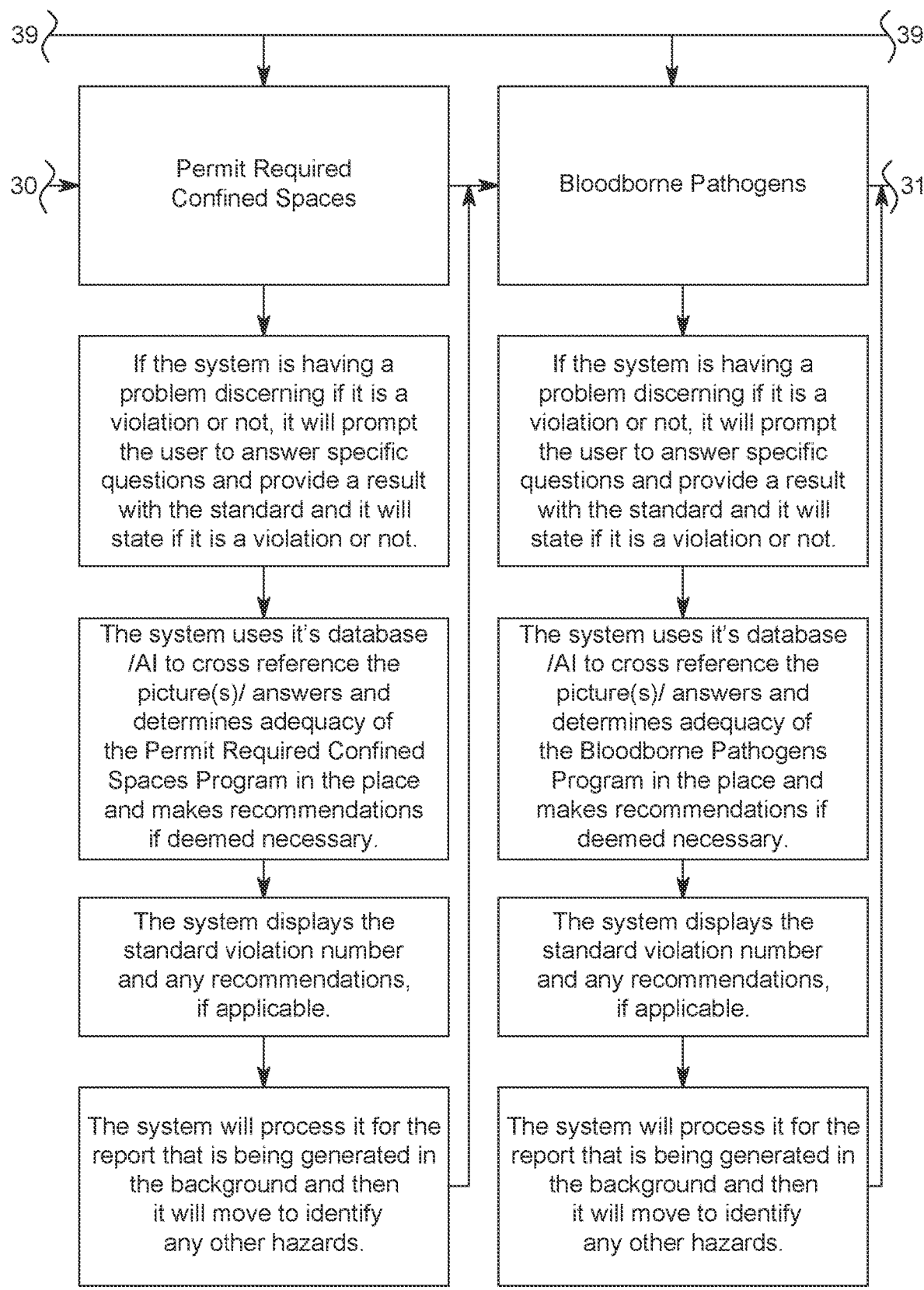
FIG. 1.21

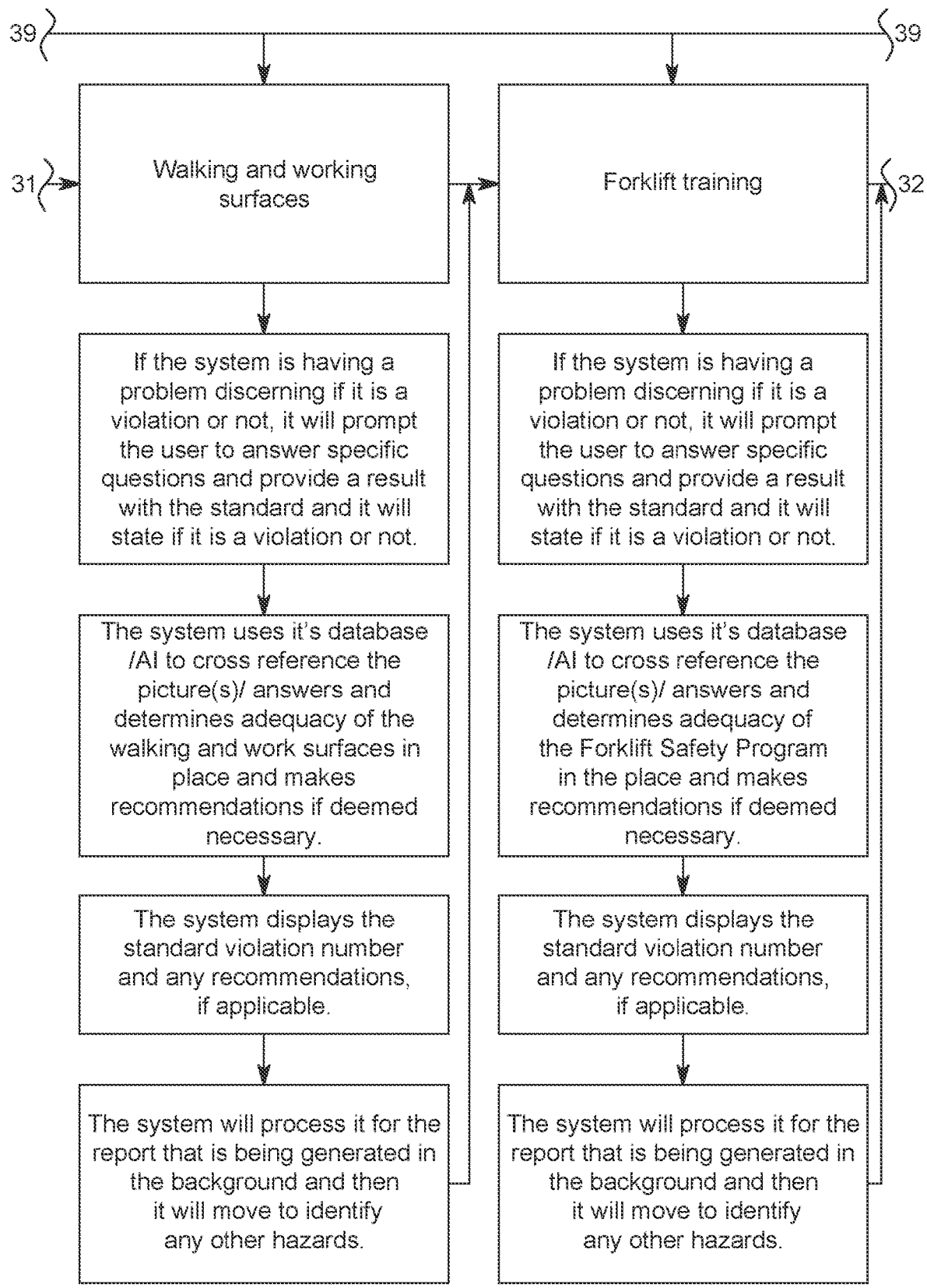
FIG. 1.22

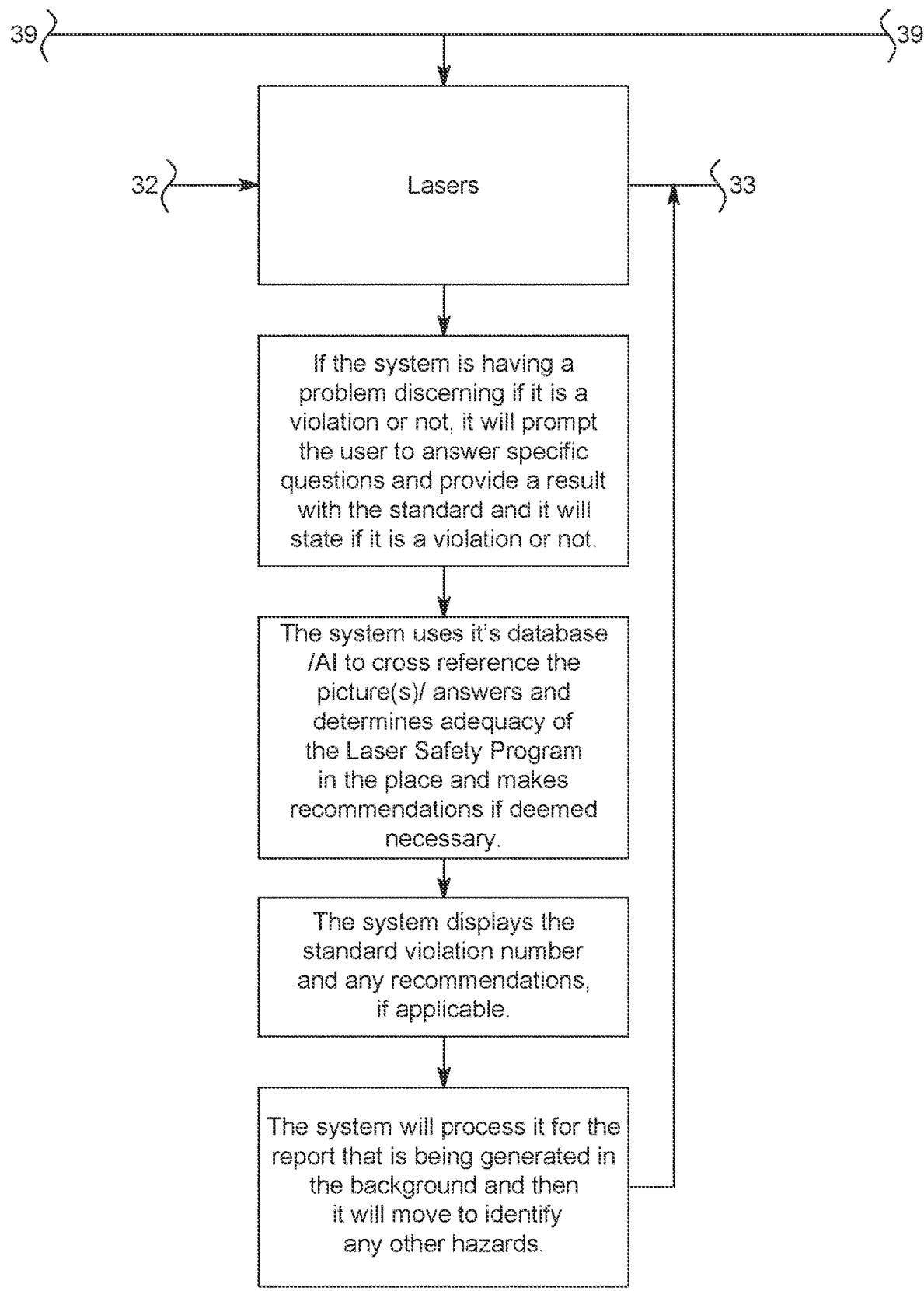
FIG. 1.23

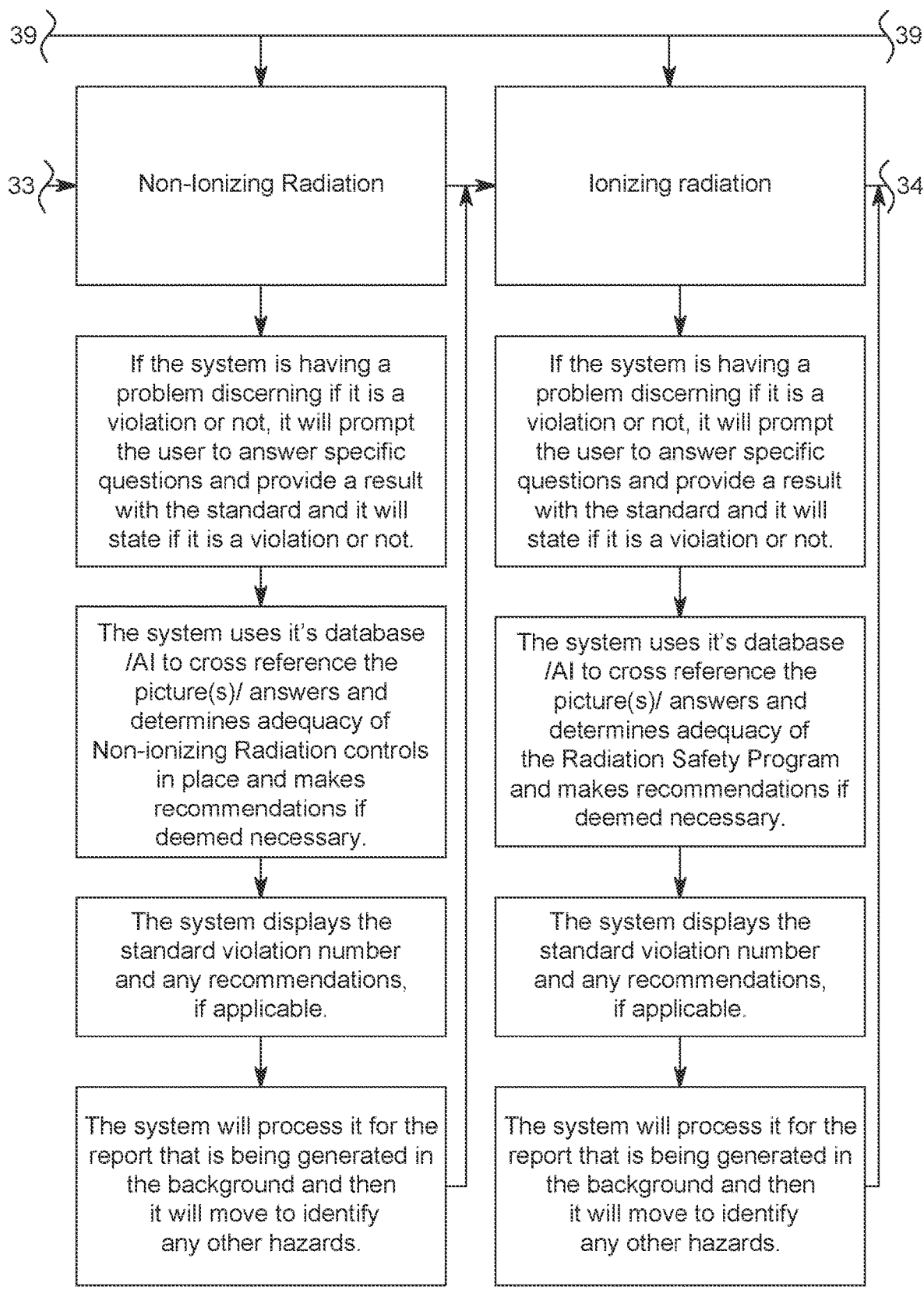
FIG. 1.24

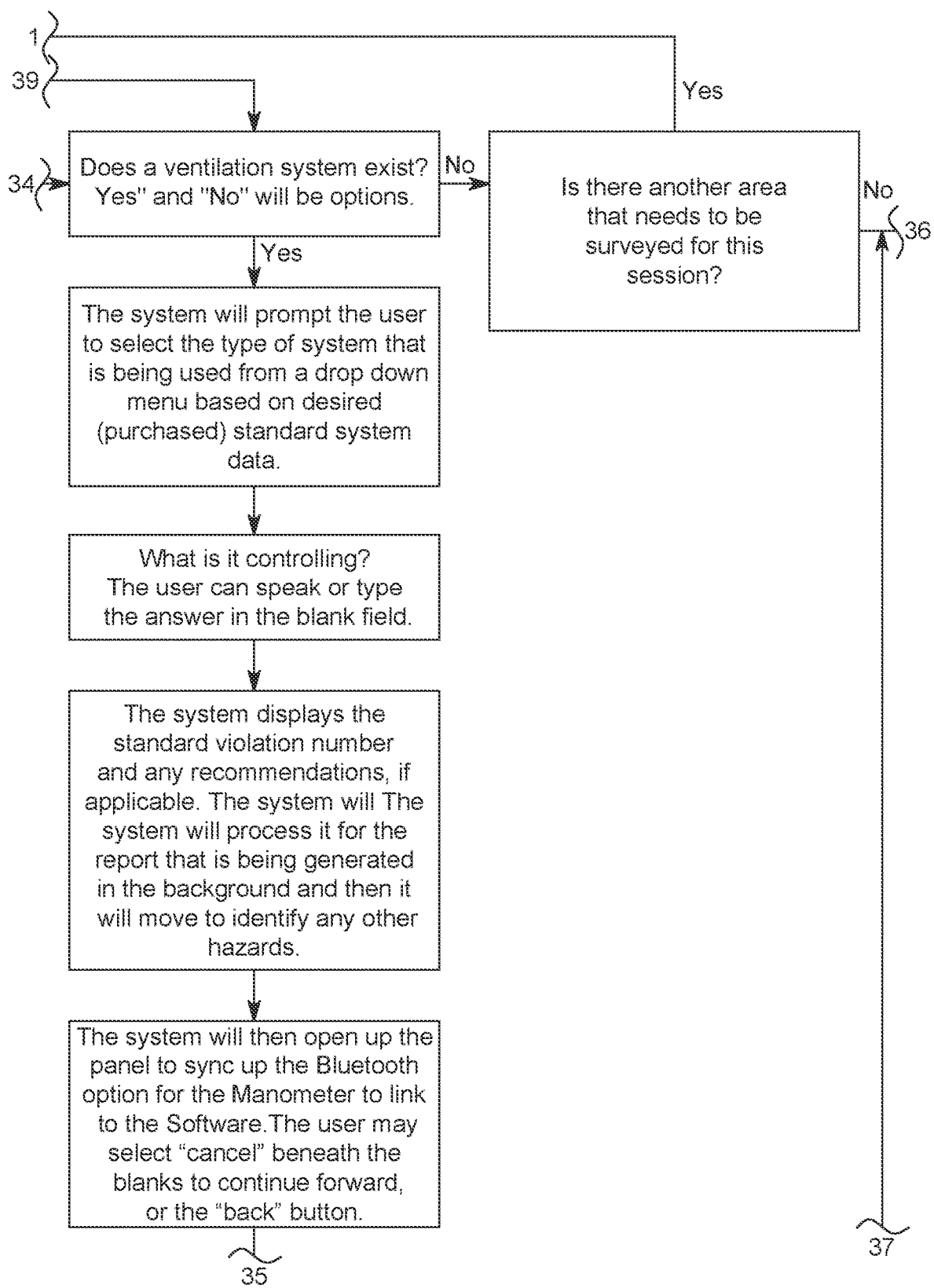
FIG. 1.25

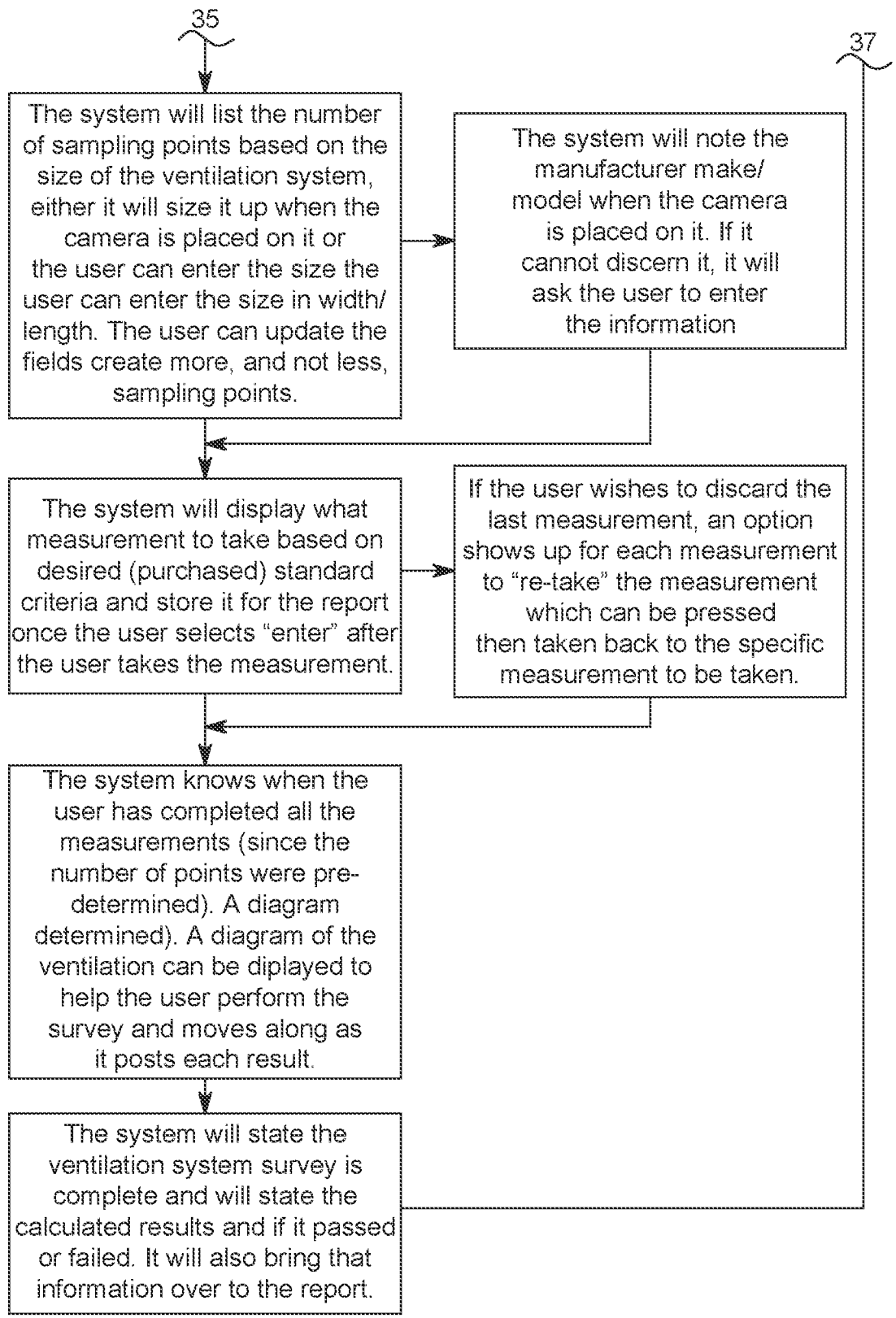
FIG. 1.26

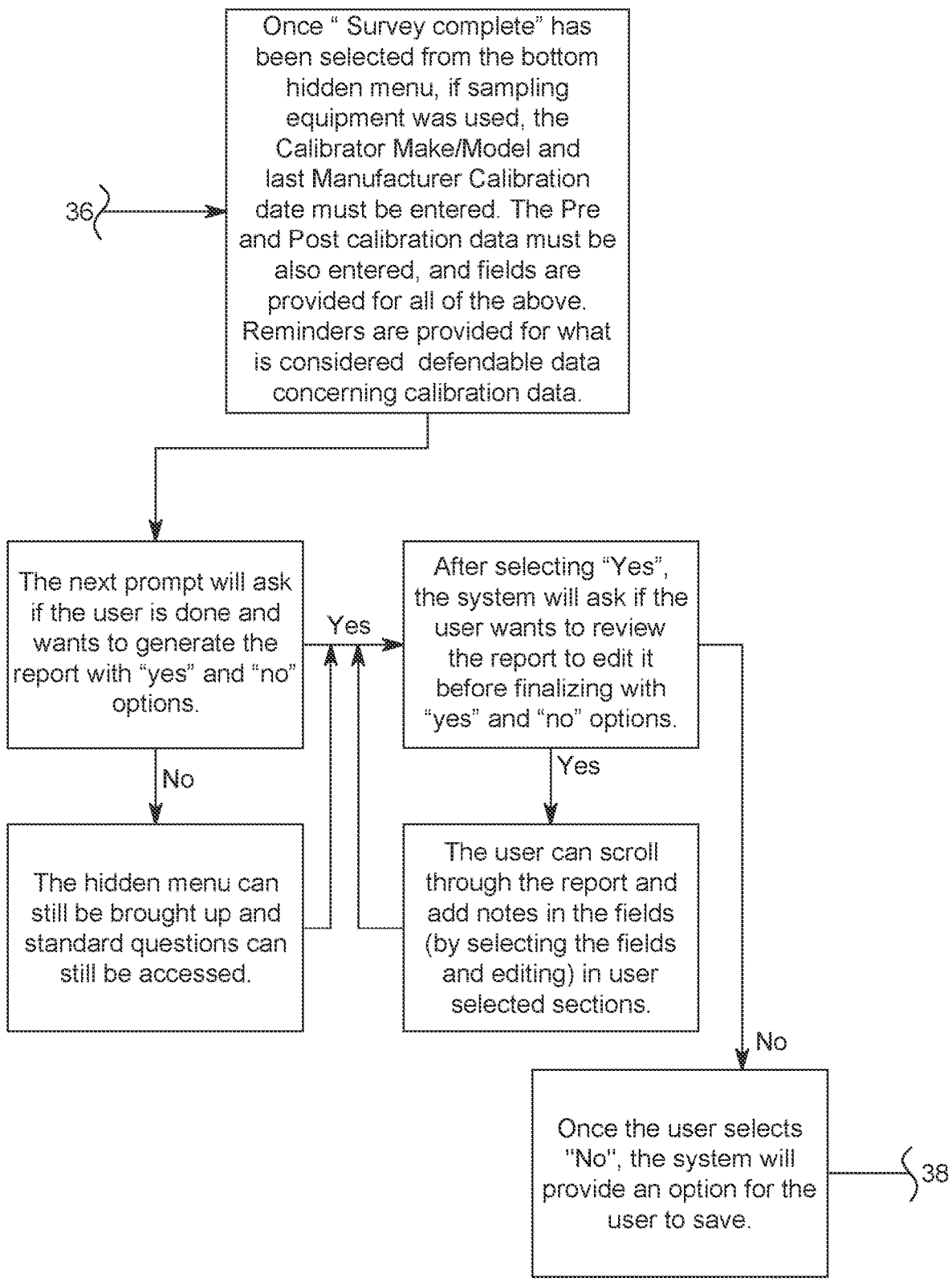
FIG. 1.27

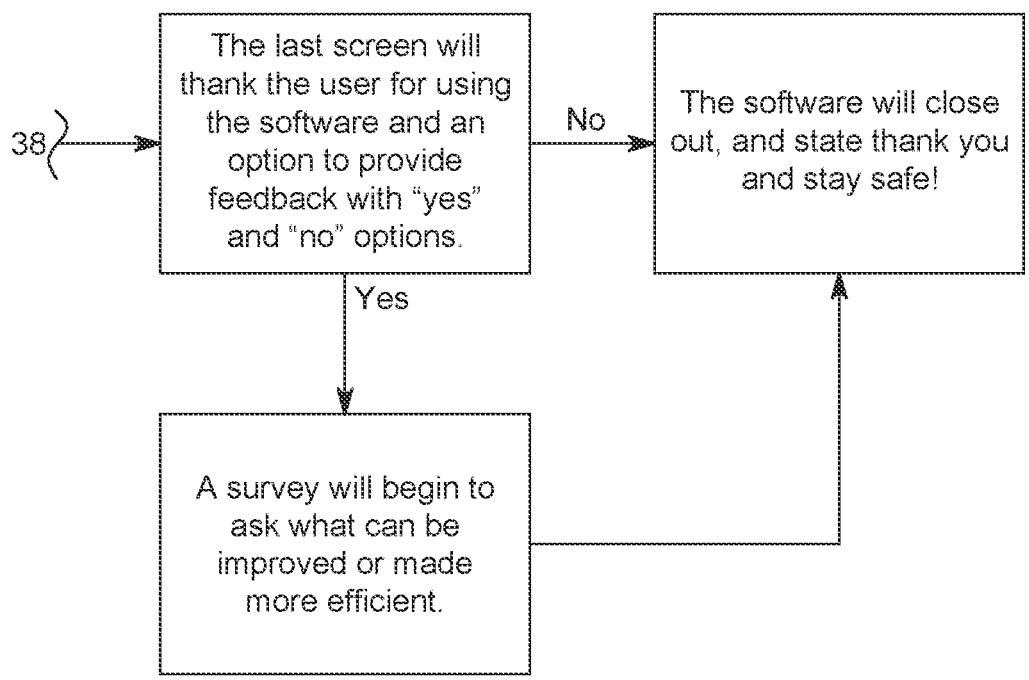
FIG. 1.28

Interactive Medical Reference System, software that includes an app for patients/doctors

The home page begins with a list of sessions with Date, Time, Patient Name, and Practioner columns. The system can be searched for a patient, date, time, or name of practitione, etc., in a search bar above the sessions. Prior session line items can turn green (user preference) when new test results have been recognized with a newly updated treatment plan that has been proposed by the system. Line items with user defined default colors indicate no new information and may be accessed if a practitioner wishes to revisit the session. The system has a button at the bottom that states "Start New Session" below the search field. A print option can be accessed when one of the sessions is highlighted, and a printer icon will appear at the end of the highlighted line item. The printer will then open the normal standard options to print the report.

Once "Start New Session" is selected, the next screen has a start up screen that asks: What is the name and address of the facility that you are employed?

A blank field is provided below the question which uses Location Services to auto-populate the Facility Name and Address but can be edited by typing in the field or the microphone can be selected and the field can be entered with speech to text. (The next session will be pre-populated from prior selections that can still be edited again.) NOTE: After this screen is populated and the user selects "Save", the next screen populates with "Back" and "Save & Continue" buttons so the user can update if needed or save the date and continue to the next page.

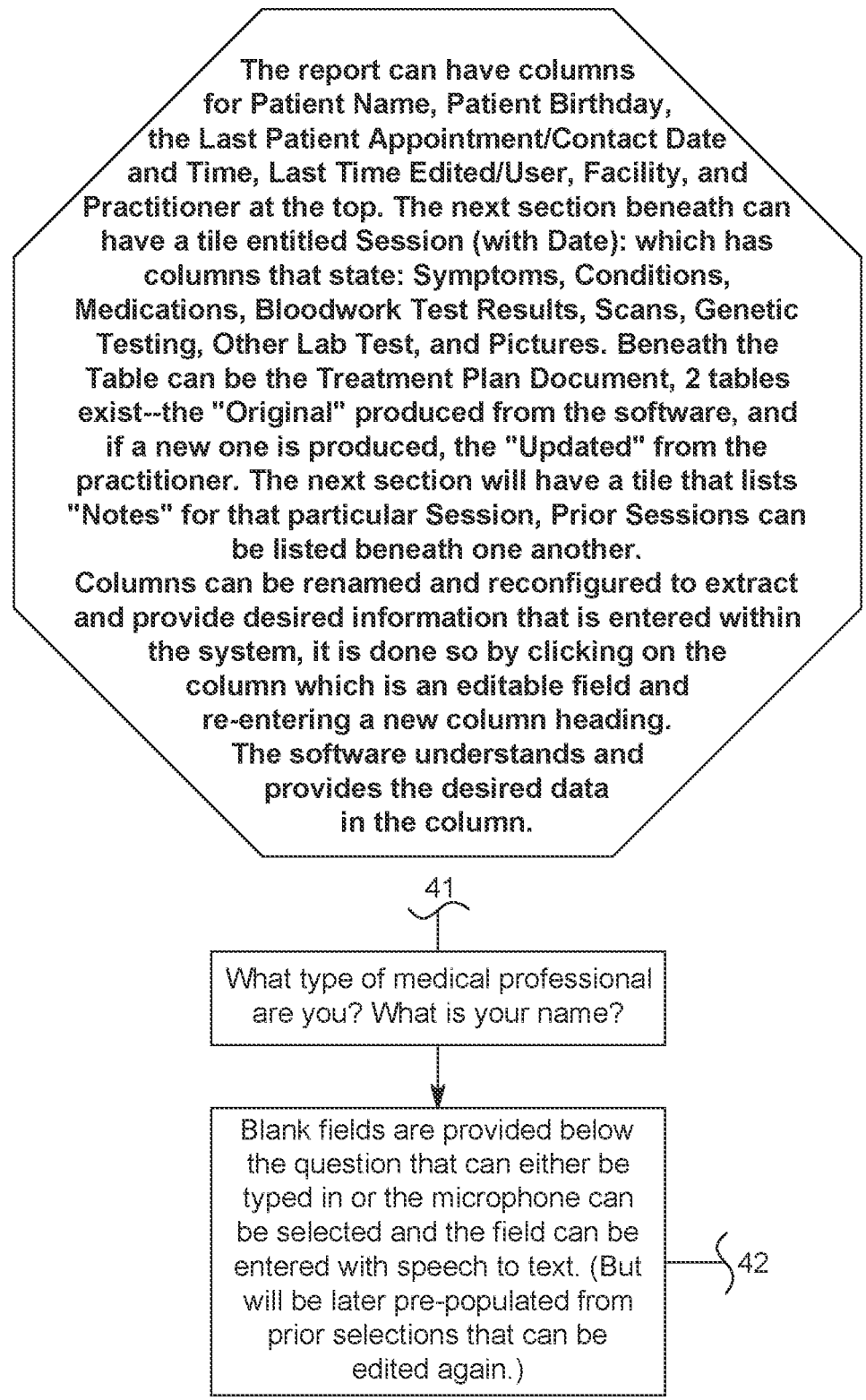
FIG. 2.2

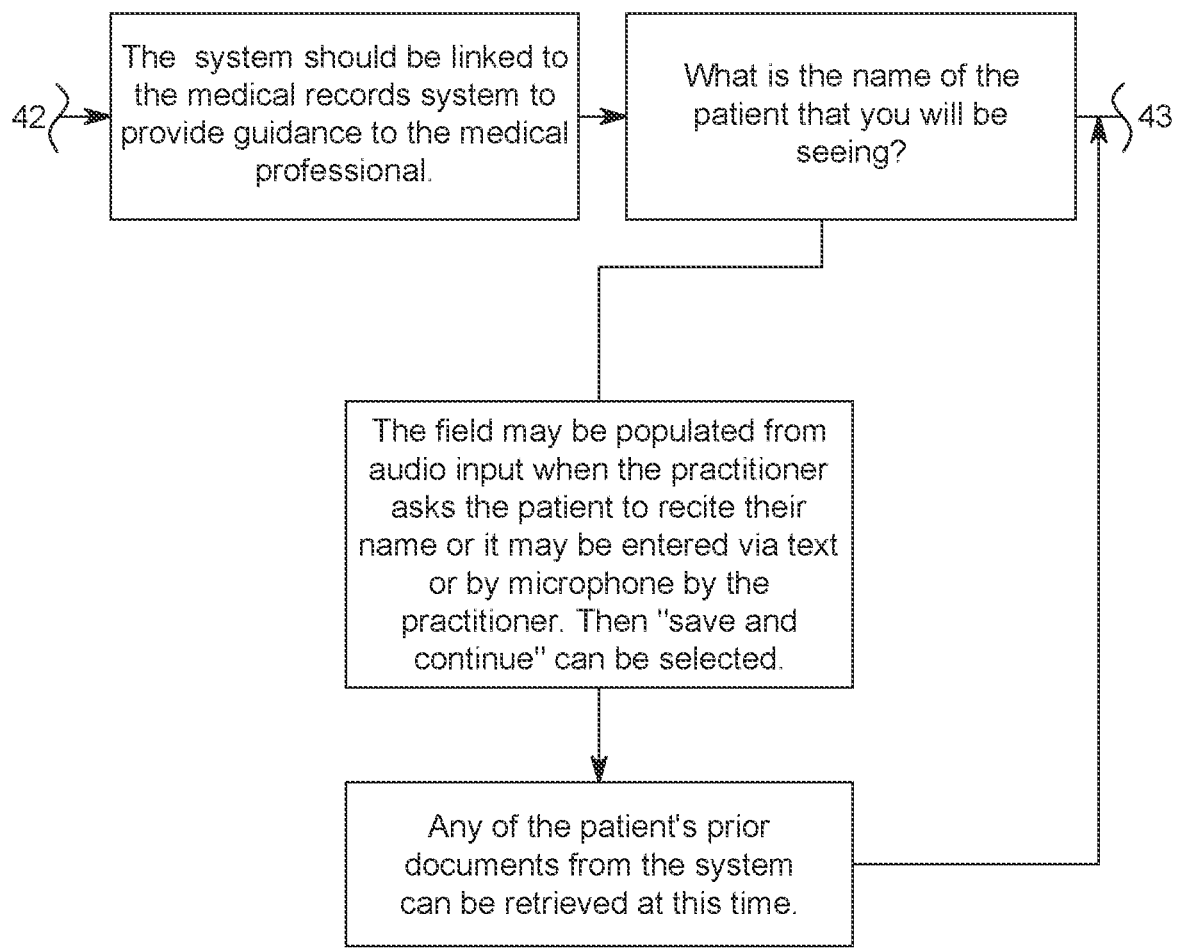
FIG. 2.3

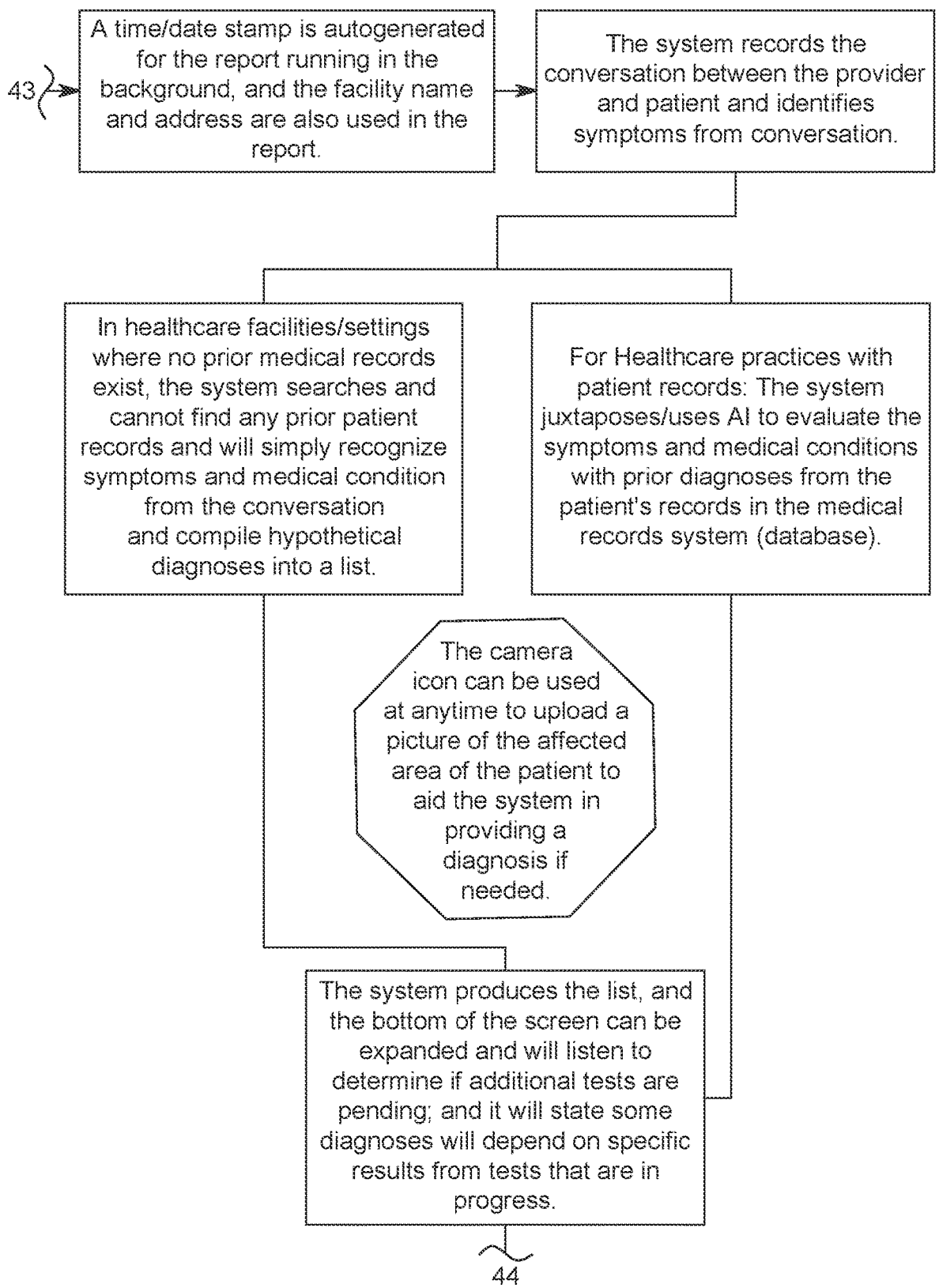
FIG. 2.4

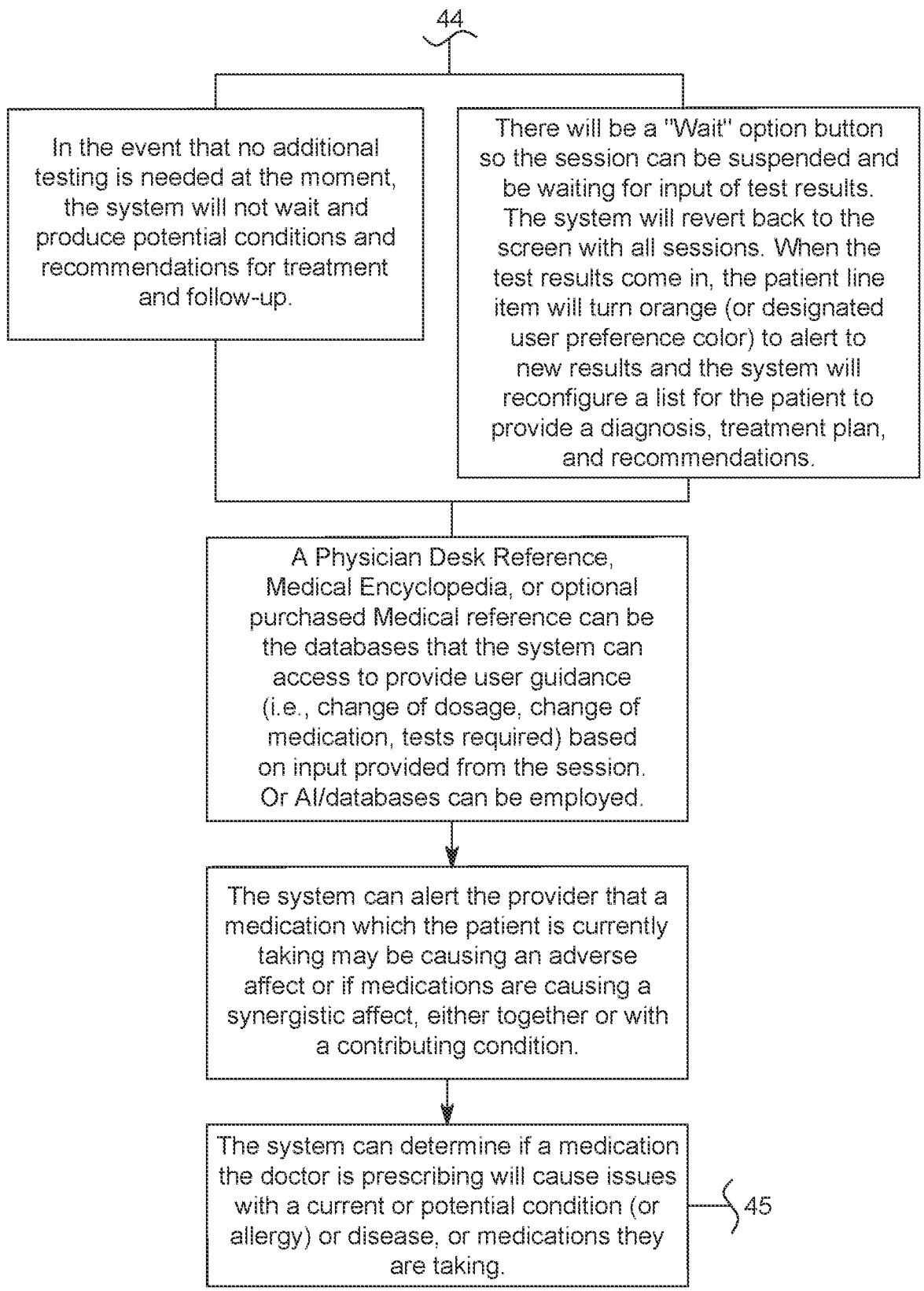
FIG. 2.5

Another version includes a training mode with the medical professional sitting in on a medical visit, and the system will do much of the same except ask questions pertaining to what condition the patient could have and what treatments should be implemented. The trainee can access the applicable Medical Reference, and also "Save" Diagnoses and Corresponding Medical Treatment. The system can provide feedback on their selections as potential outcomes and determine if they are appropriate actions or not and provide a report.

Additional reference versions can be purchased and uploaded by the user.

NOTE: Other Medical References can be used in place of ones listed here (to aid different specialized professions).

The system can identify if certain laboratory tests and scans should not be recommended based on patient history and an explanation is provided as to why at this time.

46

The patient's genetic testing and family history will also be taken into account for treatment recommendations from the system.

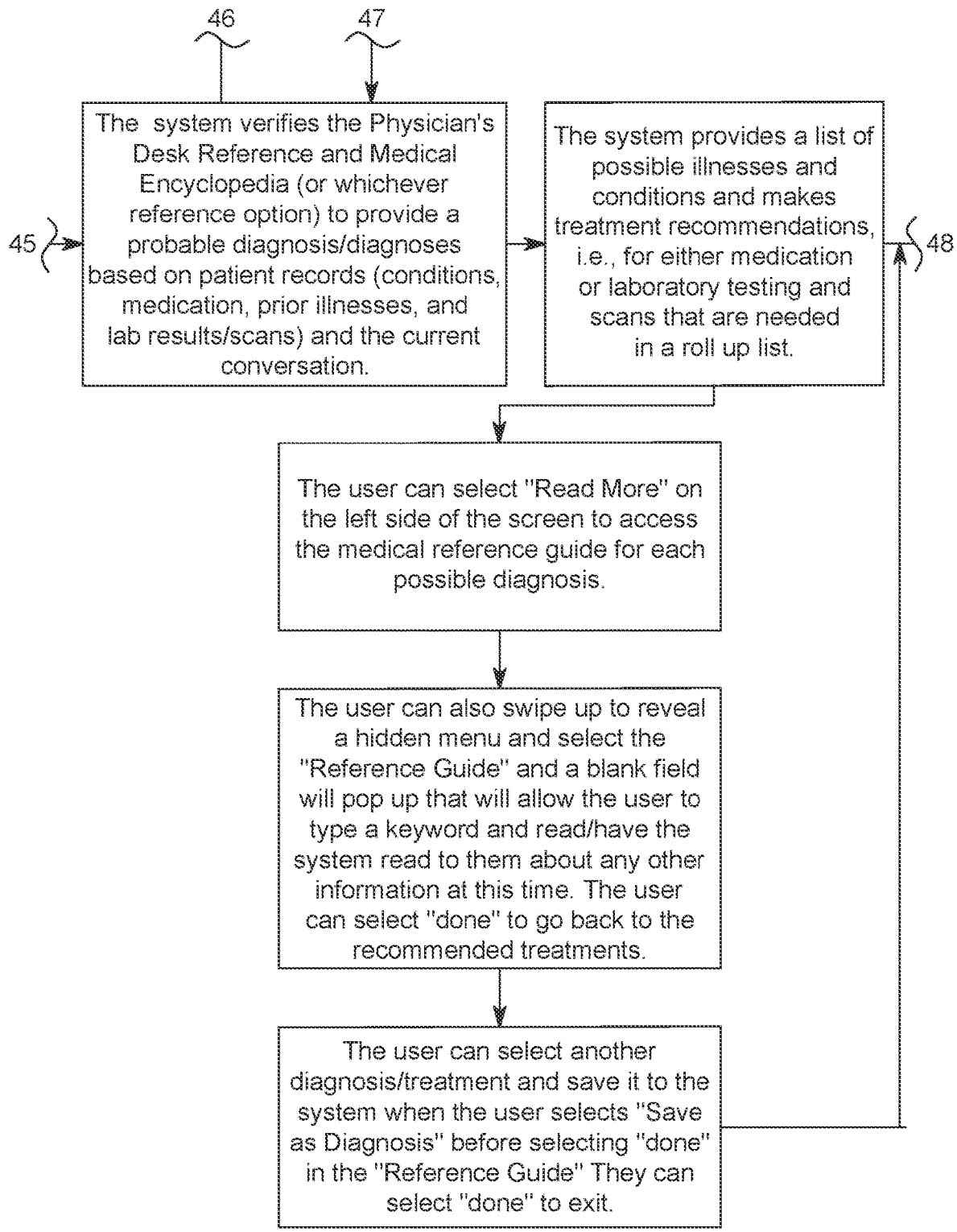
FIG. 2.7

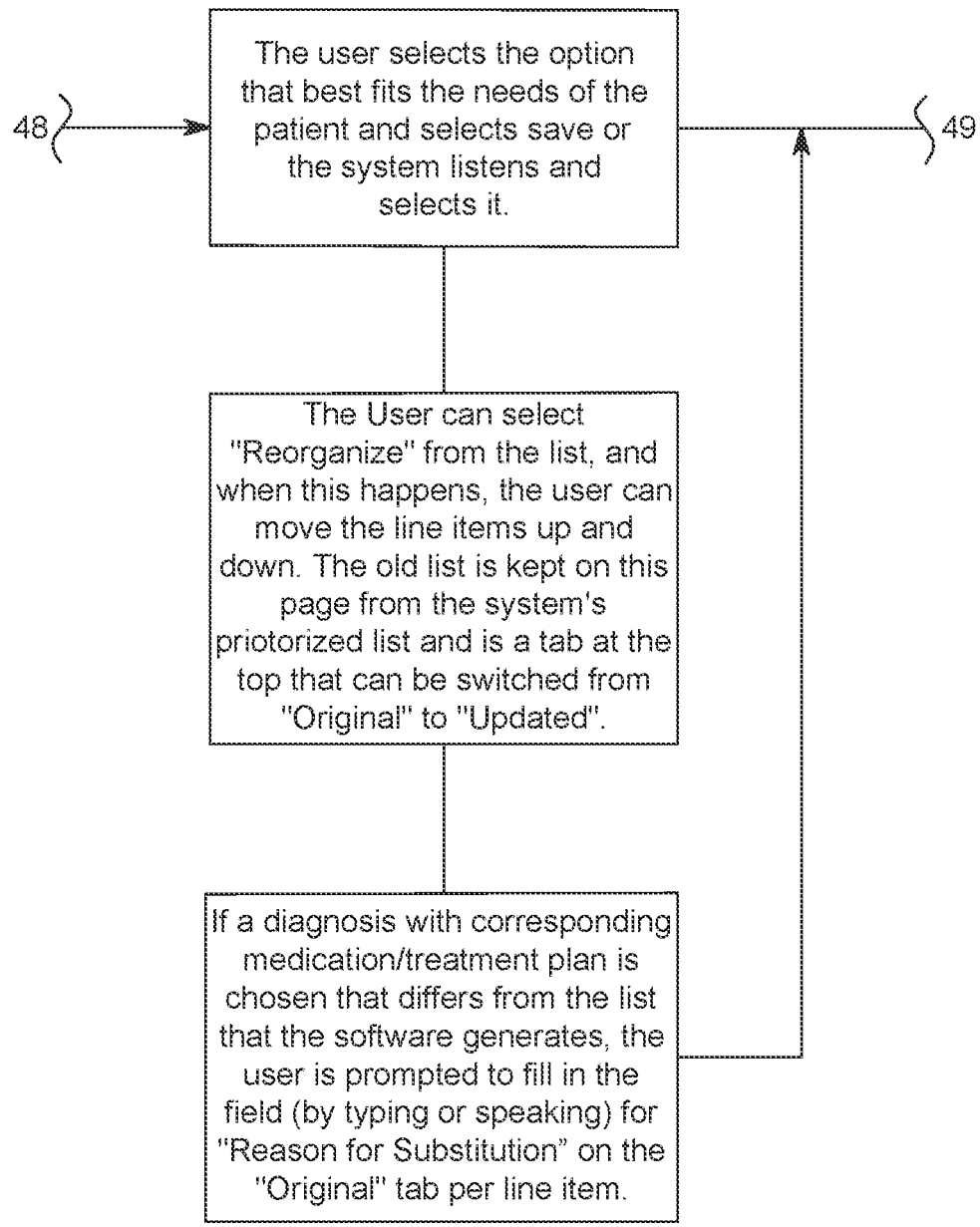
FIG. 2.8

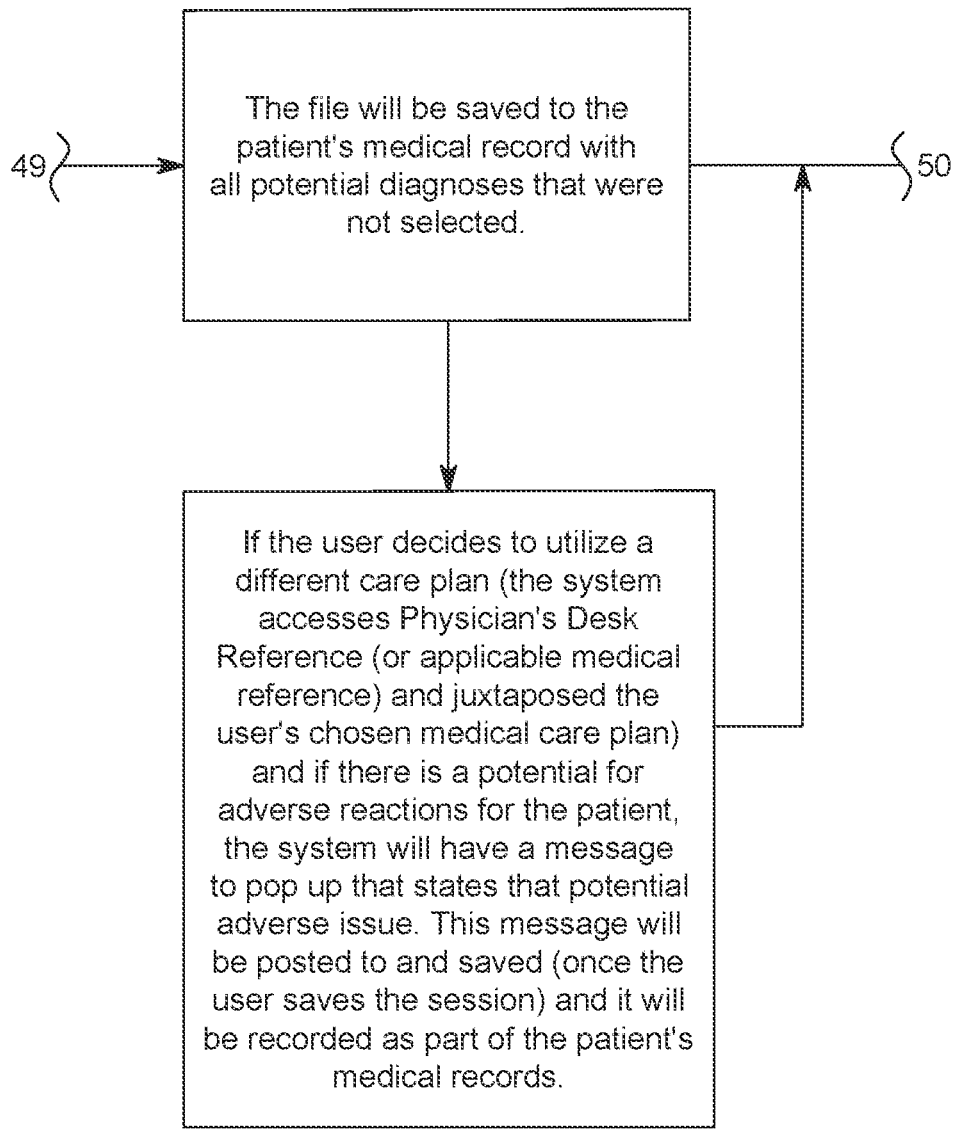
FIG. 2.9

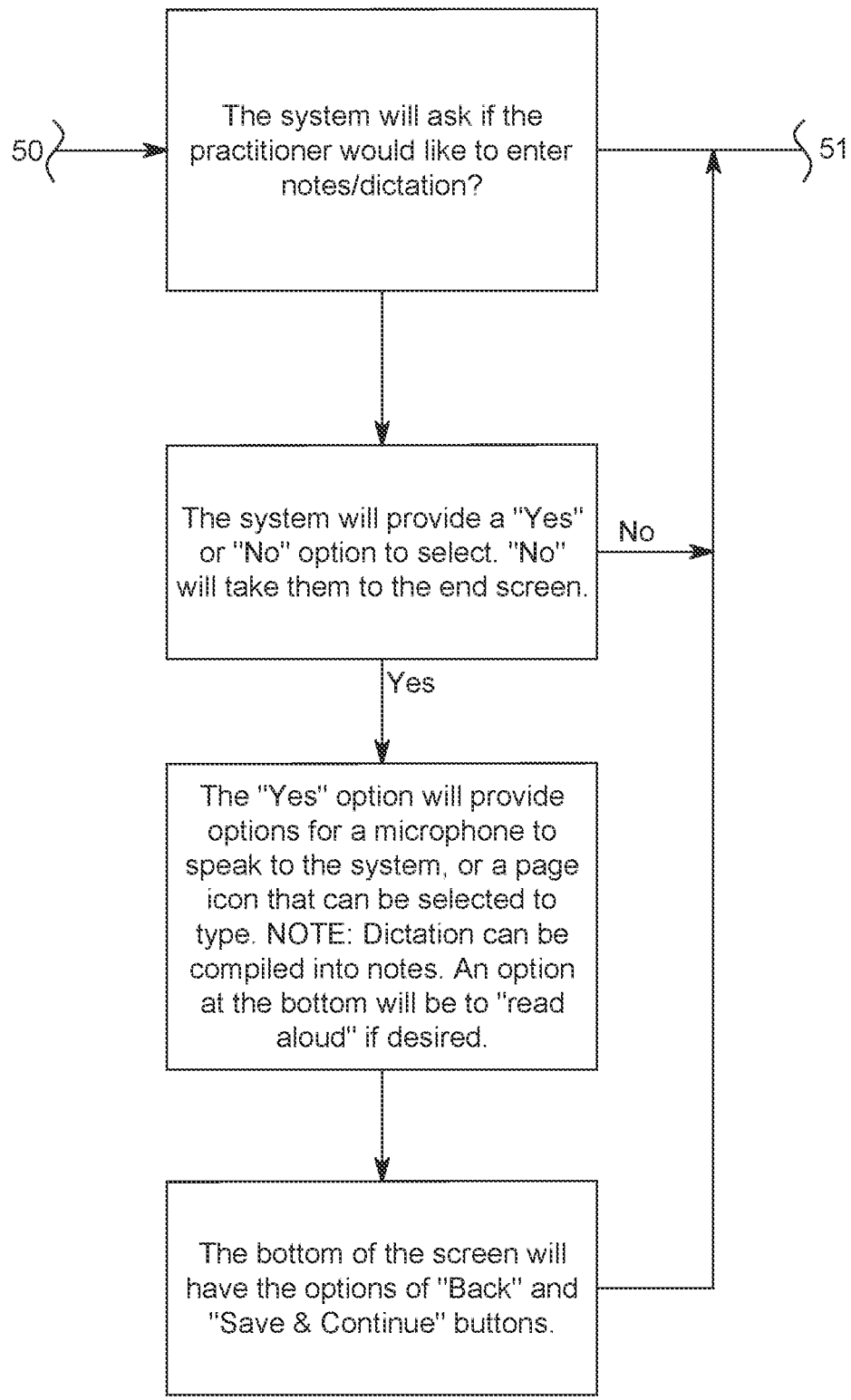
FIG. 2.10

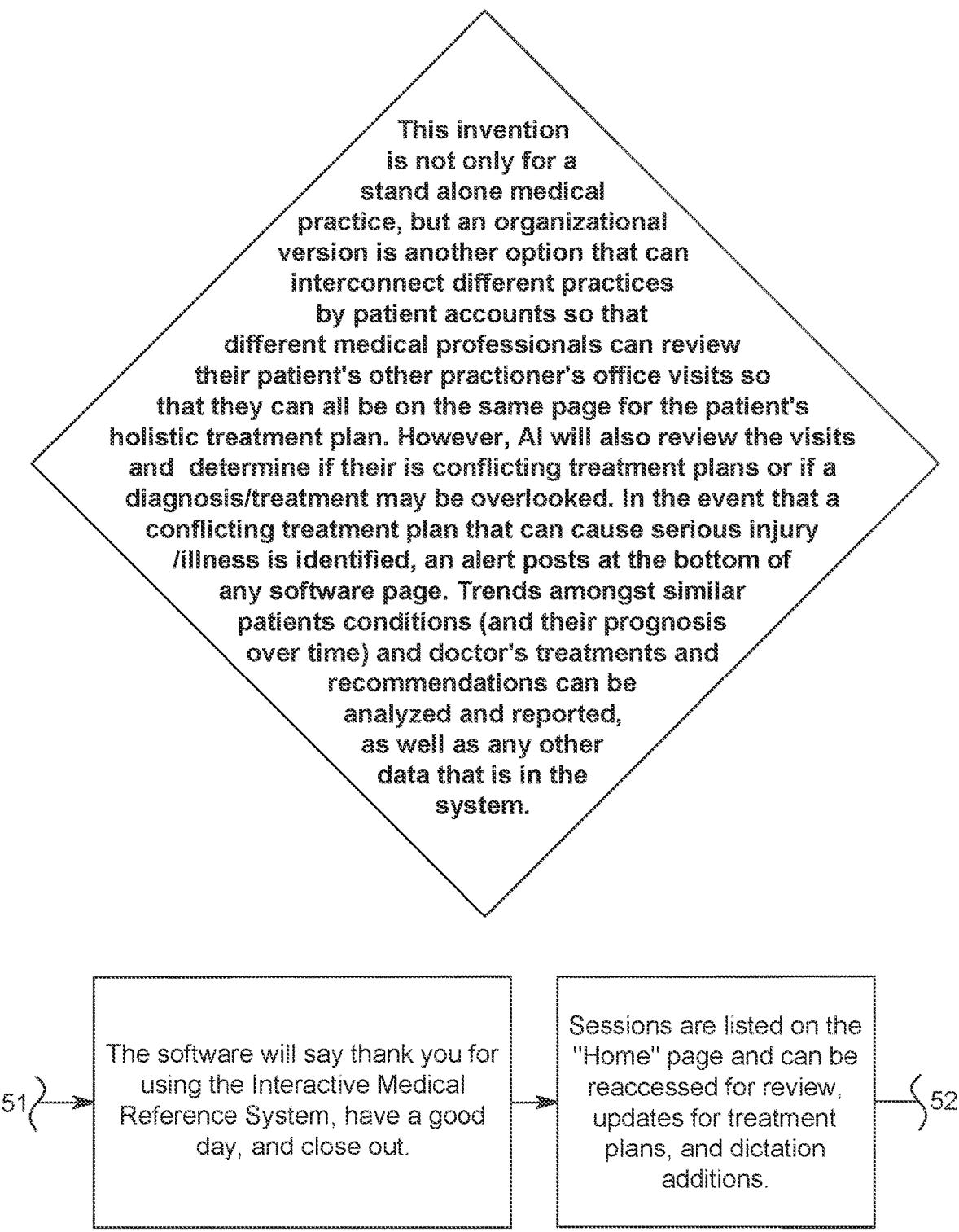
FIG. 2.11

A self-service option can be included for patients to be able to see their records under their name and each doctor visit is listed in whichever order they choose, i.e., by date or physician. The patient can request "Impromptu Visit" to be assessed by AI. Impromptu visits can be restricted for only specific conditions (UTIs, Strep, COVID, the Flu, Pregnancy, i.e., where an order can be created for a simple lab test to simply diagnose) and the Application Screen will list a disclaimer of what an Improtu visit is permitted to encompass. The applicable physcian(s) are alerted, and based upon symptoms AI can produce a diagnosis and treatment plan, which can be reviewed and approved by a medical professional. The AI system can create a lab order if needed (that can also be approved by a medical professional), that can either be sent to the lab associated with the medical practice or organization, or it can downloaded/printed for the patient to take elsewhere. Once test results are available, AI can produce a diagnosis and prescribe a medication (based on the patient medical records to prevent a synergistic affect that could occur based on other current medications or conditions or potential allergic reaction), upon approval by a medical professional. The system may or may not be set up to require medical professional review/authorizaiton before AI recommendations are sent to the patient.

52 → If a Review is made, there will be a date/ time stamp and will not continue untill the user enters/speaks their name.

If any changes to a Treatment Plan is made, a date/time stamp will be created and will not continue until the user enters/speaks their name for the editable field.

> Once the user selects "Save", the session entry will return back to the home screen of sessions.

*Patients can use the App to report updates about their health. AI can provide a list of diagnoses associated w/a condition(s) or potential other condition(s) or side affects from medication(s) or interaction thereof.*
*The App/software will be able to provide the following for Patients/Providers:*
*1-View/download/transmit patient health data*
*2-Book/cancel appointments*
*3-Request refills*
*4-View clinician notes and lab test results*
*5-Exchange messages with healthcare professionals*
*6-Complete previsit health history information*
*7-Look up health information related to health concerns, results, and prescriptions*
*8-Bill Pay with credit card services/provide payment plan options*
*9-Review insurance claims*
*10-Send free text/voicemail/phone call reminders to patients*
*11-24/365 call center patient support*
*12-Can invite people to view their medical information*
*13-Can upload documents for patient history*
*14-Integration w/EHRS, labs, pharmacies, and EMR systems*
*15- Can integrate/compatible w/ 3rd party apps, but not limited to: FitBit, Google Analytics, and Facebook, etc. So patient demographics can be tracked and integrated into the platform for further analysis/analytics/reports*
*16- Convert existing forms*
*17-Healthcare professionals can manage clinic notes/Patients can view them*
*18-Can use 2 factor authenticator or biometrics to access information*
*19-Prescription information includes medication name, dose, date filled, patient information, and refills*
*20-Virtual visit capable, can record and keep sessions, and make transcripts*
*21-Generates interative reports and visualizations to gather performance metrics and potential outcomes for clinicians or AI to make fact based decisions Users can analyze using drill down and pivot functionality*
*22-Can act like a ChatGPT*
*23-This software can encompass any or all these options presented in this diagram and can be a' la carte for the user so it can be added on to their existing patient portal/app software.*
*24-Data reports can be custom-configured to be produced at the user's discretion.*

FIG. 2.13

INTERACTIVE MANAGEMENT SYSTEM

CROSS-REFERENCE TO RELATED APPLICATION

This application claims the benefit of priority of U.S. provisional application No. 63/368,111, filed 11 Jul. 2022, the contents of which are herein incorporated by reference.

BACKGROUND OF THE INVENTION

Field of the Invention

The present invention generally relates to an interactive management system, and more particularly to an interactive management system that may assist a user in completing a task.

Description of the Related Art

Typically, a hazard audit is periodically performed for a facility. The hazard audit is an examination of the facility, and its operations and safety systems. An auditor is required to prepare an audit report after the audit. Sometimes, people lack knowledge and understanding of hazard identification for hazards that can cause illnesses, injuries, and deaths in the workplace, which is undesirable. However, this system can be retrofitted for any field of audit or inspection.

Therefore, a system is required that may assist in conveniently and accurately conducting audits.

SUMMARY OF THE INVENTION

The following presents a simplified summary of the present disclosure in a simplified form as a prelude to the more detailed description that is presented herein.

In accordance with embodiments of the invention, there is provided a system that includes a transceiver and a processor. The transceiver may be configured to receive information associated with a facility. The processor may be communicatively coupled to the transceiver. The processor may be configured to obtain information from the transceiver, determine a probability of a hazard based on the information, and generate a hazard report based on the determination of the probability of the hazard in the facility.

In some aspects, the information associated with the facility may include video footage of the facility or images of the facility. In further aspects, the information associated with the facility may include a sound level in the facility, an air quality reading in the facility, and/or ventilation information. Depending upon the audit, other data may be required to be acquired during the survey.

In further aspects, the processor may be configured to identify hazardous equipment, conditions, work practices, and substances based on the information. In addition, the processor may be configured to determine a hazard type associated with the hazardous equipment, conditions, work practices, and substances responsive to identifying the hazardous equipment, and determine the probability of the hazard responsive to determining the hazard type.

In further aspects, the processor may be configured to provide recommendation for remediation responsive to determination of the probability of the hazard in the facility.

In further aspects, the processor may be configured to output real-time notification to a user to obtain the information associated with the facility.

The present disclosure is further directed to a method that may include obtaining, by a processor, information associated with a facility. The method may further include determining, by the processor, a probability of a hazard based on the information. The method may further include generating, by the processor, a hazard report based on the determination of the probability of the hazard in the facility.

The present disclosure discloses a system that may assist users to perform audits efficiently and accurately, using Artificial Intelligence (AI). The system further creates an audit report and populates survey data into a database, which saves time and effort of the users in generating audit reports. In addition, the system provides teaching to the users (e.g., auditors) in real time to capture the measurements in the field accurately, and aids in determining hazard and recommends a control. The system may be used in other industries as well. For example, a doctor may use the system to diagnose a patient health in real-time. In this case, the system may assist the doctor in improving patient's health.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which:

FIG. 1 depicts use of an example interactive management system for auditing a facility, in accordance with embodiments of the invention, wherein FIG. 1.1 through FIG. 1.28 are, respectively, detailed views of individual components of interactive management system for auditing a facility which FIG. 1 provides an overview of;

FIG. 2 depicts use of an example interactive management system for assisting doctors, in accordance with embodiments of the invention, wherein FIG. 2.1 through FIG. 2.13 are, respectively, detailed views of individual components of interactive management system for assisting doctors, which FIG. 2 provides an overview of.

DETAILED DESCRIPTION OF INVENTION

Figure 1:
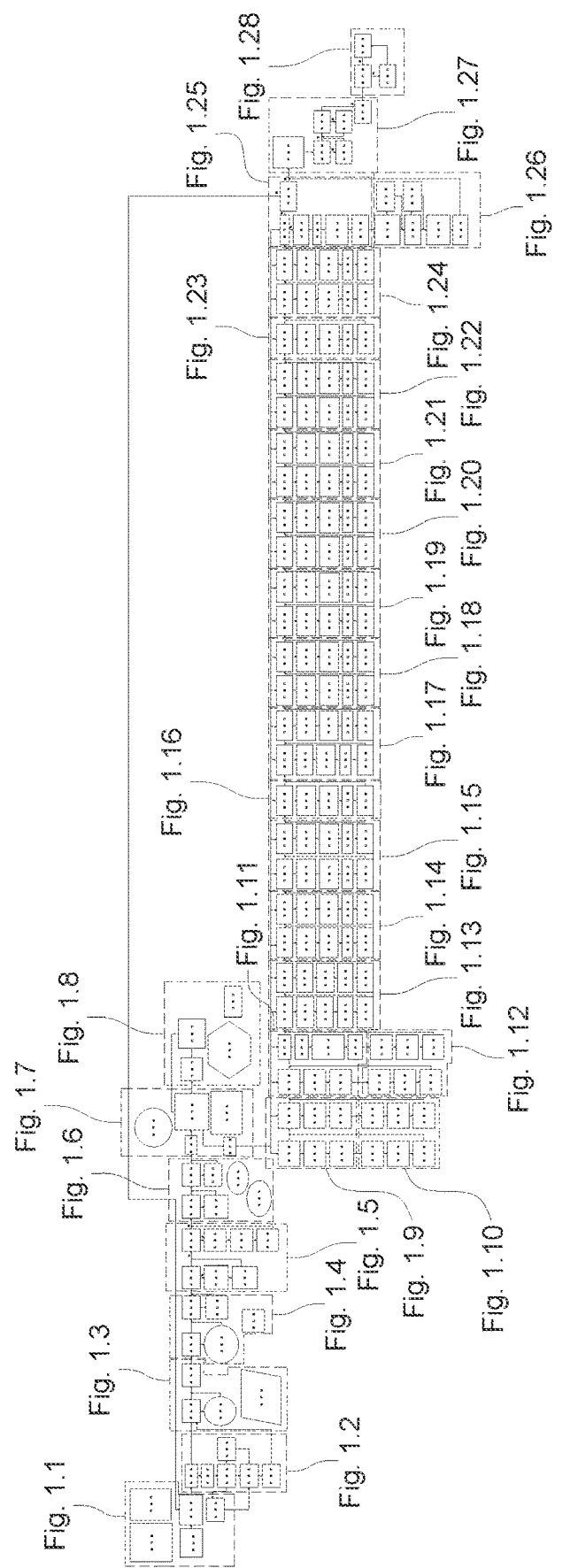

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 depicts use of an example interactive management system for auditing a facility, in accordance with embodiments of the invention. FIG. 1 is divided into different portions and is labeled as FIGS. 1.1-1.28.

The interactive management system (or system) is configured to assist a user (e.g., an auditor) in auditing the facility. In an exemplary embodiment, the facility may include a construction site, a building, or any workplace. The user may be, for example, a building code inspector, a hospital inspector, a nursing home inspector, a food inspector, a civil engineering inspector, an insurance auditor, a construction inspector, and/or the like.

The system embodied in the present invention may be configured to normalization of data normalizes data sources (claims, clinical, labs, etc.) and brings them into one unified source, derive meaning from unstructured data, and provide AI-driven insights that predict outcomes by analyzing diseases, signs, symptoms, medications, procedures, test results, and demographic data extracted from clinical datasets. It uses medical literature and real-world data curated by machine learning.

The system may include a transceiver and a processor that may be communicatively coupled with each other. The transceiver may be configured to receive information associated with the facility and may store the inputs in a database associated with the system. The processor may be configured to obtain information from the transceiver and determine a probability of a hazard based on the information. The information may include, for example, a video footage of the facility, images of the facility, a sound level in the facility, an air quality measurement in the facility, ventilation information, and/or the like depending upon the type of inspection being performed. The processor may be further configured to generate a hazard report (e.g., an audit report) based on the determination of the probability of the hazard in the facility, and recommend controls In some aspects, the processor may be configured to identify hazardous equipment, conditions, work practices, and substances based on the information. In addition, the processor may determine hazard type associated with the hazardous equipment, condition, work practice, and substances responsive to identifying the hazardous equipment, condition, or work practice and determine the probability of the hazard responsive to determination of the hazard type. In further aspects, the processor may provide recommendation for remediation responsive to determination of the probability of the hazard in the facility. Furthermore, the processor may output real-time notification to a user to obtain the information associated with the facility.

The system may also listen and take notes which may be provided on the end report, and use the data to automatically fill out appropriate fields and report associated with the database. Personnel can access the report (e.g., on a left-hand menu of a database user interface) or request the system to bring up the report to view it and fill it out, or ask the system a question on the report and the system can speak/display the information. The process of performing the audit is described below.

Block 101 of FIG. 1.1 describes that a startup screen of the system asks: What is the name and address of the facility that you are surveying?

Block 102 of FIG. 1.1 describes that a blank editable field is provided below the question that has the option for location services to provide the company address or the user can either type in or the microphone can be selected and the field can be entered with speech to text.

Block 103 of FIG. 1.2 describes that the system may ask: what is the company/entity industry?

Block 104 of FIG. 1.2 describes that another free texts/speak to text field is provided for entry.

Block 105 of FIG. 1.2 describes that the system may first ask "Are you surveying for Private Industry or for the Government?

Block 106 of FIG. 1.1 describes that if Private Industry is chosen, a drop-down menu of Industry types is provided to be selected by the user.

Block 107 of FIG. 1.2 describes that if Government is chosen, a drop-down menu of types of fields is provided to be selected by the user.

Block 108 of FIG. 1.2 describes that Pre-loaded industry/field specific data is then loaded to be asked during the survey based on common hazards that are typically found for the selections chosen.

Block 109 of FIG. 1.2 describes that this dictates the data subset that may be asked during the survey based upon the type of areas that are entered during the session.

Block 110 of FIG. 1.3 describes that a time/data stamp may be autogenerated for the report running in the background, and the facility name and address may also be used in the report.

Block 111 of FIG. 1.3 describes that a bottom of the screen may have a hidden pop up menu that has an exit option and at any time, and at this stage, if existed, it may ask if the user wishes to discard the survey. "Back", "Continue and Save", and "Cancel" buttons exist on all pages.

Block 112 of FIG. 1.3 describes that in the system, two modes are available: Training Mode and On-site Assistant Mode. After the location is entered, the next screen will ask which mode the user wants to use, and a Button (the buttons will be beneath the question) for "Training" will be on the right-hand side and a button for "On-site Assistant" will be on the left hand side. The report at the end may compile what the trainee knew and did not know, and for the On-site Assistant Mode, the report may produce an attachment with the same information. When Training Mode is chosen, a banner at the top may state "Training" at the top of every screen. Analytics is also an option that may be used for metrics on surveys, i.e., common issues, oversights, etc.

Block 113 of FIG. 1.3 describes that the next screen asks "Who is in attendance for the survey?"

Block 114 of FIG. 1.4 describes that the user may enter each name and title, the blanks provided have "Name" beneath the first field on the left, then "Title" on the next field on the right.

Block 115 of FIG. 1.4 describes that two rows are provided having the same options, and once the second name/title have been entered, a "+" sign at the end appears and can be selected to create a new row each time a new name/title is entered. The user may select "Save and Continue" beneath the names to continue forward, or the "Back" button.

Block 116 of FIG. 1.4 describes that the next screen asks the user "What area will you be surveying first?"

Block 117 of FIG. 1.4 describes that the user may have a blank to enter the name of the area that is being surveyed. The user may select "Save and Continue" beneath the blanks to continue forward, or the "Back" button.

Block 118 of FIG. 1.5 describes that the user may be asked if Sound Level measurement will be taken? Two pop up selections open for "Yes" and "No".

Block 119 of FIG. 1.5 describes that if "Yes" is selected, the system may open up the panel to sync up the Bluetooth option for the dosimeter/SLM to link to the system. The user may select "Save and Continue" beneath the blanks to continue forward, or the "back" button.

Block 120 of FIG. 1.5 describes that the user may be asked to start a session on the dosimeter/SLM. The user may select "Save and Continue" once it is done to continue forward, or the "back" button/cancel. Data may be saved for the report that is generated at the end.

Block 121 of FIG. 1.5 describes the next prompt asks if air samples will be taken? Two pop up selections open for "Yes" and No".

Block 122 of FIG. 1.5 describes that if "Yes" is selected, the system may open up the panel to sync up the Bluetooth option for the Environmental Sampling monitor to the system.

Block 123 of FIG. 1.5 describes that the user may be asked to select the contaminant from the drop down list (if they have a sampling method).

Block 124 of FIG. 1.5 describes that the user may be asked to start a session on the Environmental Sampling Monitor.

Block 125 of FIG. 1.4 describes that all measurement/sampling equipment must be calibrated before the session. Calibration information will be "blue toothed" over to the system to ensure dependability, along with monitor make/type.

Block 126 of FIG. 1.6 describes that the user may be asked the names of the personnel they interview in the survey area.

Block 127 of FIG. 1.6 describes that two rows are provided having the same options, and once the second name/title have been entered, a "+" sign at the end appears and can be selected to create a new row each time a new name/title is entered.

Block 128 of FIG. 1.6 describes that the user may be asked "Begin survey". A "Yes" or "Pause" option will be located below the question for selection.

Block 129 of FIG. 1.6 describes that the user can select "Yes" when ready, if "Pause" was selected.

Block 130 of FIG. 1.6 describes that a hidden menu can be available at the bottom for the user to access the "interactive standards" once a session has been started.

Block 131 of FIG. 1.6 describes that the user can select "interactive standards" and ask a question by either typing or using speech entry. The answer may be displayed and read aloud (the sound can be turned down during the session).

Block 132 of FIG. 1.7 describes that specific questions may be focused below based on the industry that was selected previously. This flowchart is a visual representation of how the system can operate from one section to another and is not all inclusive for the standards that may need to be evaluated.

This can also be software that is loaded onto a robot, which would be especially handy for dangerous/potential IDLH environments.

Block 133 of FIG. 1.7 describes that the user may be prompted to point the tablet camera to the room.

Block 134 of FIG. 1.7 describes that the interactive software can identify hazardous equipment and conditions present. Footage is taken and can either be selected for photos when the report is generated, but it is automatically loaded if the system finds a violation or if the user specifies there is a violation of non-compliance by taking a picture from the "picture" option. The flowchart continues by giving examples of subject matter that the system can identify, but it does so in the order that it finds it.

Block 135 of FIG. 1.8 describes that at any time, the user can opt to take a picture and the hidden menu below has an option for the user to enter their own violation under "manual violation entry"

Block 136 of FIG. 1.8 describes that at any time, the user can swipe up to reveal a hidden menu that has an option for "notes" under each of the categories after a section has been evaluated regardless of identification of a violation or not. Otherwise, dialogue can be captured and listed on the captured picture and listed on the report.

Block 137 of FIG. 1.7 describes that for the On-site Assistant mode, upon finding potential air containments, radiological hazards, ionizing/non-ionizing hazards, noise hazards, ergonomic hazards, and heat stress hazards (anything that can be quantified that is a hazard), the system may recommend sampling at that time and it will be noted on the report. Otherwise, in Training mode, the system may ask the Trainee if they have identified anything. If they miss anything, it can display a message with anything they've missed and it may be on the report at the end for Trainees and on the attachment for the On-Site Assistant Mode.

Block 138 of FIG. 1.7 describes Hazards in Question (Examples).

Block 139 of FIG. 1.8 describes the system may display a screen on the left hand side with a menu of all the subject areas/standards that should be surveyed. At any point, if the system determines that sampling or measurements need to be taken, it may prompt the user to make the measurements and record the results at that time under any applicable subject area/standard. Data may be saved once "Save and Continue" is selected. The user can select the subject area/standard section link to review the data that was saved and only the data that the user entered can be edited. Therefore, anything that AI finds cannot be deleted/edited; only notes can be added. A log of edited/deleted files may be maintained by the system that a user can review.

Block 140 of FIG. 1.8 describes that there is potentially extensive revenue that could be generated if PPE companies would pay to have their products listed as a control where the system identifies violations where controls are deemed inadequate/non-existent.

Block 141 of FIG. 1.9 describes that the system can identify if proper guarding is not in place.

Block 142 of FIG. 1.9 describes that if the system cannot process the image, then questions may be asked for the user to answer to determine compliance.

Block 143 of FIG. 1.9 describes that the system may ask the type/manufacturer/model/make of the equipment, or a picture may be taken while the system is running (by accessing the hidden menu and selecting "picture" obtained by a picture or entry) that is in question.

Block 144 of FIG. 1.10 describes that the system may ask questions that verify compliance with the standard in a "yes" and "no" format.

Block 145 of FIG. 1.10 describes that the system displays the standard violation number and any recommendations, if applicable.

Block 146 of FIG. 1.10 describes that the system may process it for the report that is being generated in the background and then it will move to identify any other hazards.

Block 147 of FIG. 1.9 describes that if the system is having a hard time locating the hazardous equipment, it may ask for the equipment type, manufacturer, make and SN to be entered.

Block 148 of FIG. 1.9 describes that the equipment may be put into the report along with contaminant and sound level readings at this time.

Block 149 of FIG. 1.9 describes if noise is found to be present, or if contaminants are present, then the system may ask the user if they wish to document it.

Block 150 of FIG. 1.10 describes that the system may ask questions that verify compliance with the any applicable standard in a "yes" and "no" format.

Block 151 of FIG. 1.10 describes that the system displays the standard violation number and any recommendations, if applicable.

Block 152 of FIG. 1.10 describes that the system may process it for the report that is being generated in the background and then it will move to identify any other hazards.

Block 153 of FIG. 1.11 describes that the system can measure distance to determine if railing, toe guards, isle widths, etc., are to specification (e.g., if the system is having hard time locating the equipment, as described in block 147).

Block 154 of FIG. 1.11 describes that the system may ask what is to be measured with options from a drop down menu.

Block 155 of FIG. 1.11 describes that the system may ask the user to point the camera and it may measure it.

Block 156 of FIG. 1.12 describes that if the system is having a problem discerning if it is a violation or not, that system may prompt the user to answer specific questions and provide a result with the standard and it may state if it is a violation or not.

Block 157 of FIG. 1.12 describes that the system displays the standard violation number and any recommendations, if applicable.

Block 158 of FIG. 1.12 describes that the system may process it for the report that is being generated in the background and then it may move to identify any other hazards.

Block 159 of FIG. 1.11 describes that the system can identify PPE being used and ask what chemicals/hazards are present that require the identified PPE.

Block 160 of FIG. 1.11 describes that the system has a database/uses AI that will produce information stating if the PPE is adequate to control the hazard.

Block 161 of FIG. 1.11 describes that the system may ask the type/manufacturer/model/make of the PPE, or a picture may be taken while the system is running (by accessing and selecting "picture", and the system may take that data, along with the chemical/hazard that is present in a picture or entry) that is in question.

Block 162 of FIG. 1.11 describes that the system uses AI/database to cross reference the PPE and contaminants to determine adequacy of PPE and makes recommendations if deemed necessary.

Block 163 of FIG. 1.12 describes that the system may generate a series of questions for the user to answer to determine compliance for any OSHA expanded standards found at this time.

Block 164 of FIG. 1.12 describes that the system displays the standard violation number and any recommendations, if applicable.

Block 165 of FIG. 1.12 describes that the system may process it for the report that is being generated in the background and then it may move to identify any other hazards.

Block 166 of FIG. 1.13 describes that the system can identify if there is a violation of electric code.

Block 167 of FIG. 1.13 describes that if the system is having a problem discerning if it is a violation or not, it may prompt the user to answer specific questions and provide a result with the standard and it will state if it is a violation or not.

Block 168 of FIG. 1.13 describes that the system uses it's database/AI to cross reference the picture(s)/answers and determines adequacy of electrical systems and makes recommendations if deemed necessary.

Block 169 of FIG. 1.13 describes that the system displays the standard violation number and any recommendations, if applicable.

Block 170 of FIG. 1.13 describes that the system may process it for the report that is being generated in the background and then it may move to identify any other hazards.

Block 171 of FIG. 1.13 describes that the system asks if there is electrical safe work practices in place.

Block 172 of FIG. 1.13 describes that the system may provide a series of questions to ask, which may be "video recorded" or manually entered, and determine compliance.

Block 173 of FIG. 1.13 describes that the system uses it's database/AI to cross reference the picture(s)/answers and determines adequacy of safe work practices in place and makes recommendations if deemed necessary.

Block 174 of FIG. 1.13 describes that the system displays the standard violation number and any recommendations, if applicable.

Block 175 of FIG. 1.13 describes that the system may process it for the report that is being generated in the background and then it will move to identify any other hazards.

Block 176 of FIG. 1.14 describes that for construction: cranes, the system follows the steps described below.

Block 177 of FIG. 1.14 describes that if the system is having a problem discerning if it is a violation or not, it may prompt the user to answer specific questions and provide a result with the standard and it will state if it is a violation or not.

Block 178 of FIG. 1.14 describes that the system uses it's database/AI to cross reference the picture(s)/answers, and determines adequacy of crane operations and makes recommendations if deemed necessary.

Block 179 of FIG. 1.14 describes that the system displays the standard violation number and any recommendations, if applicable.

Block 180 of FIG. 1.14 describes that the system may process it for the report that is being generated in the background and then it may move to identify any other hazards.

Block 181 of FIG. 1.14 describes that the system can detect if scaffolding systems are adequate.

Block 182 of FIG. 1.14 describes if the system is having a problem discerning if it is a violation or not, it will prompt the user to answer specific questions and provide a result with the standard and it will state if it is a violation or not.

Block 183 of FIG. 1.14 describes that the system uses it's database/AI to cross reference the picture(s)/answers and determines adequacy of scaffolding systems and makes recommendations if deemed necessary.

Block 184 of FIG. 1.14 describes that the system displays the standard violation number and any recommendations, if applicable.

Block 185 of FIG. 1.14 describes that the system may process it for the report that is being generated in the background and then it may move to identify any other hazards.

Blocks 186 of FIG. 1.15 describes that the system can detect if fall protection systems are adequate.

Blocks 187-190 of FIG. 1.15 describe content similar to blocks 177-180 of FIG. 1.14, and are hence not repeated for the sake of clarity and conciseness.

Block 191 of FIG. 1.15 describes that if the system detects combustible and flammable chemicals, it can store the names of the chemicals and will ask for the amounts used to be entered.

Block 192 of FIG. 1.15 describes that if the system is having a problem discerning if a violation exists or not, it will prompt the user to answer specific questions and provide a result with the standard and it will state if it is a violation or not.

Block 193 of FIG. 1.15 describes the system uses it's database/AI to cross reference the picture(s)/answers and determines adequacy of combustible and flammable usage and makes recommendations if deemed necessary.

Block 194 of FIG. 1.15 describes that the system displays the standard violation number and any recommendations, if applicable.

Block 195 of FIG. 1.15 describes that the system may process it for the report that is being generated in the background and then it may move to identify any other hazards.

Block 196 of FIG. 1.16 describes that if the system detects combustible and flammable storage, it can store the names of the chemicals and may ask for the amounts stored to be entered.

Block 197 of FIG. 1.16 describes that if the system is having a problem discerning if it is a violation or not, it may prompt the user to answer specific questions and provide a result with the standard and it will state if it is a violation or not.

Block 198 of FIG. 1.16 describes that the system uses it's database/AI to cross reference the picture(s)/answers, and determines adequacy of storage conditions and makes recommendations if deemed necessary.

Block 199 of FIG. 1.16 describes that the system displays the standard violation number and any recommendations, if applicable.

Block 200 of FIG. 1.16 describes that the system may process it for the report that is being generated in the background and then it may move to identify any other hazards.

Block 201 of FIG. 1.17 describes the system can detect if ladders are being employed and are used appropriately.

Block 202 of FIG. 1.17 describes that the system may provide a series of questions to ask, which may be video recorded or manually entered (including manufacturer information), and determine compliance.

Block 203 of FIG. 1.17 describes the system uses it's database/AI to cross reference the picture(s)/answers and determines adequacy of ladder usage and makes recommendations if deemed necessary Block 204 of FIG. 1.17 describes that the system displays the standard violation number and any recommendations, if applicable.

Block 205 of FIG. 1.17 describes that the system may process it for the report that is being generated in the background and then it may move to identify any other hazards.

Block 206 of FIG. 1.17 describes system for the Welding Operations.

Block 207 of FIG. 1.17 describes that if the system is having a problem discerning if it is a violation or not, it may prompt the user to answer specific questions and provide a result with the standard and it may state if it is a violation or not.

Block 208 of FIG. 1.17 describes that the system uses it's database/AI to cross reference the picture(s)/answers and determines adequacy of welding controls and makes recommendations if deemed necessary.

Block 209 of FIG. 1.17 describes that the system displays the standard violation number and any recommendations, if applicable.

Block 210 of FIG. 1.17 describes that the system may process it for the report that is being generated in the background and then it may move to identify any other hazards.

Block 211 of FIG. 1.18 describes system for Emergency showers/eyewashes.

Blocks 212-215 of FIG. 1.18 describes content similar to the blocks 207-210 of FIG. 1.17, and are hence not repeated for the sake of clarity and conciseness.

Block 216 of FIG. 1.18 describes system of signage.

Blocks 217-270 of FIG. 1.18 describes content similar to the blocks 212-215 of FIG. 1.18, and are hence not repeated for the sake of clarity and conciseness.

Block 221 of FIG. 1.19 describes system for Compressed gas storage.

Blocks 222-225 of FIG. 1.19 describes content similar to the blocks 212-215 of FIG. 1.18, and are hence not repeated for the sake of clarity and conciseness.

Blocks 226 of FIG. 1.19 describes system for Hazcom compliance.

Blocks 227-230 of FIG. 1.19 describes content similar to the blocks 212-215 of FIG. 1.18, and are hence not repeated for the sake of clarity and conciseness.

Block 231 of FIG. 1.20 describes system for Fire suppression systems and fire extinguishers.

Blocks 232-235 of FIG. 1.20 describes content similar to the blocks 212-215 of FIG. 1.18, and are hence not repeated for the sake of clarity and conciseness.

Block 236 of FIG. 1.20 describes system for Lock-out-tag-out.

Blocks 237-240 of FIG. 1.20 describes content similar to the blocks 212-215 of FIG. 1.18, and are hence not repeated for the sake of clarity and conciseness.

Block 241 of FIG. 1.21 describes system for Permit Required Confined Spaces.

Blocks 242-245 of FIG. 1.21 describes content similar to the blocks 212-215 of FIG. 1.18, and are hence not repeated for the sake of clarity and conciseness.

Block 246 of FIG. 1.21 describes system for Bloodborne Pathogens.

Blocks 247-250 of FIG. 1.21 describes content similar to the blocks 212-215 of FIG. 1.18, and are hence not repeated for the sake of clarity and conciseness.

Block 251 of FIG. 1.22 describes system for Walking and working surfaces.

Blocks 252-255 of FIG. 1.22 describes content similar to the blocks 212-215 of FIG. 1.18, and are hence not repeated for the sake of clarity and conciseness.

Block 256 of FIG. 1.22 describes system for Forklift training.

Blocks 257-260 of FIG. 1.22 describes content similar to the blocks 212-215 of FIG. 1.18, and are hence not repeated for the sake of clarity and conciseness.

Block 261 of FIG. 1.23 describes system for Lasers.

Blocks 262-265 of FIG. 1.23 describes content similar to the blocks 212-215 of FIG. 1.18, and are hence not repeated for the sake of clarity and conciseness.

Block 266 of FIG. 1.24 describes system for Non-Ionizing Radiation.

Blocks 267-270 of FIG. 1.24 describes content similar to the blocks 212-215 of FIG. 1.18, and are hence not repeated for the sake of clarity and conciseness.

Block 271 of FIG. 1.24 describes system for Ionizing radiation.

Blocks 272-275 of FIG. 1.24 describes content similar to the blocks 212-215 of FIG. 1.18, and are hence not repeated for the sake of clarity and conciseness.

Block 276 of FIG. 1.25 describes an option displayed to the user, "does a ventilation system exist?" "Yes" and "No" will be options.

Block 277 of FIG. 1.25 describes that the system may prompt the user to select the type of system that is being used from a drop down menu based on desired (purchased) standard system data.

Block 278 of FIG. 1.25 describes that the system may ask what is it controlling. The user can speak or type the answer in the blank field.

Block 279 of FIG. 1.25 describes that the system displays the standard violation number and any recommendations, if applicable. The system may process it for the report that is being generated in the background and then it may move to identify any other hazards.

Block 280 of FIG. 1.25 describes that the system displays the standard violation number and any recommendations, if applicable. The system may process it for the report that is being generated in the background and then it may move to identify any other hazards.

Block 281 of FIG. 1.26 describes that the system may list the number of sampling points based on the size of the ventilation system, either it may size it up when the camera is placed on it or the user can enter the size in width/length. The user can update the fields, create more, and not fewer, sampling points.

Block 282 of FIG. 1.26 describes that the system may note the manufacturer make/model when the camera is placed on it. If it cannot discern it, it may ask the user to enter the information.

Block 283 of FIG. 1.26 describes the system may display what measurement to take based on desired (purchased) standard criteria and store it for the report once the user selects "enter" after the user takes the measurement.

Block 284 of FIG. 1.26 describes that if the user wishes to discard the last measurement, an option shows up for each measurement to "re-take" the measurement which can be pressed then taken back to the specific measurement to be taken.

Block 285 of FIG. 1.26 describes that the system knows when the user has completed all the measurements (since the number of points were predetermined). A diagram of the ventilation can be displayed to help the user perform the survey and move along as it posts each result.

Block 286 of FIG. 1.26 describes that the system may state the ventilation system survey is complete and may state the calculated results and if it passed or failed. It will also bring that information over to the report.

Block 287 of FIG. 1.25 describes that the system may ask, "is there another area that needs to be surveyed for this session?".

Block 288 of FIG. 1.27 describes that once "Survey complete" has been selected from the bottom hidden menu, if sampling equipment was used, the Calibrator Make/Model and last Manufacturer Calibration date must be entered. The Pre and Post calibration data must be also entered, and fields are provided for all of the above. Reminders are provided for what is considered defendable data concerning calibration data.

Block 289 of FIG. 1.27 describes that the next prompt may ask if the user is done and wants to generate the report with "yes" and "no" options.

Block 290 of FIG. 1.27 describes that the hidden menu can still be brought up and standard questions can still be accessed.

Block 291 of FIG. 1.27 describes after selecting "Yes", the system may ask if the user wants to review the report to edit it before finalizing with "yes" and "no" options.

Block 292 of FIG. 1.27 describes that the user can scroll through the report and add notes in the fields (by selecting the fields and editing) in user selected sections.

Block 293 of FIG. 1.27 describes that once the user selects "No", the system may provide an option for the user to save.

Block 294 of FIG. 1.28 describes that the last screen may thank the user for using the system and an option to provide feedback with "yes" and "no" options.

Block 295 of FIG. 1.28 describes that a survey may begin to ask what can be improved or made more efficient.

Block 296 of FIG. 1.28 describes that the software may close out, and state thank you and stay safe!

The present disclosure is further directed to a method that may include obtaining, by a processor, information associated with a facility. The method may further include determining, by the processor, a probability of a hazard based on the information. The method may further include generating, by the processor, a hazard report based on the determination of the probability of the hazard in the facility.

Figure 2:
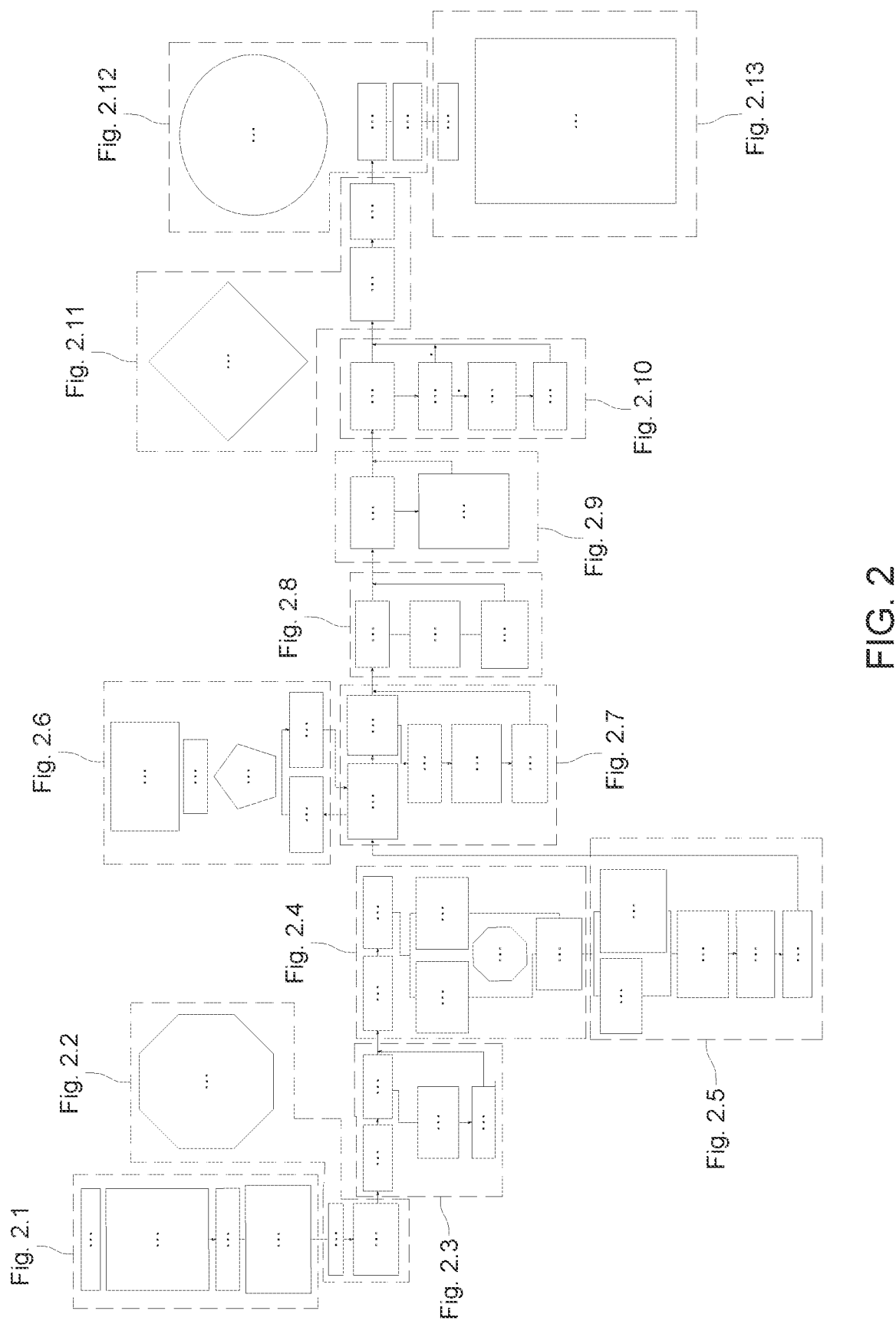

FIG. 2 depicts use of an example interactive management system for assisting doctors, in accordance with embodiments of the invention. In some aspects, the interactive management system may be same as the interactive management system described in conjunction with FIG. 1.

Block 301 in FIG. 2.1 describes an Interactive Medical Reference System ("system") that includes an app for patients/doctors.

Block 302 in FIG. 2.1 describes that the home page begins with a list of sessions with Date, Time, Patient Name, and practitioner columns. The system can be searched for a patient, date, time, or name of practitioner, etc., in a search bar above the sessions. Prior session line items can turn green (user preference) when new test results have been recognized with a newly updated treatment plan that has been proposed by the system. Line items with user defined default colors indicate no new information and may be accessed if a practitioner wishes to revisit the session. The system has a button at the bottom that states "Start New Session" below the search field. A print option can be accessed when one of the sessions is highlighted, and a printer icon will appear at the end of the highlighted line item. The printer will then open the normal standard options to print the report.

Block 303 of FIG. 2.1 describes that once "Start New Session" is selected, the next screen has a startup screen that asks: What is the name and address of the facility that you are employed?

Block 304 of FIG. 2.1 describes that a blank field is provided below the question which uses Location Services to auto-populate the Facility Name and Address but can be edited by typing in the field or the microphone can be selected and the field can be entered with speech to text. (The next session will be pre-populated from prior selections that can still be edited again.) After this screen is populated and the user selects "Save", the next screen populates with "Back" and "Save & Continue" buttons so the user can update if needed or save the date and continue to the next page.

Block 305 of FIG. 2.2 describes that the report can have columns for Patient Name, Patient Birthday, the Last Patient Appointment/Contact Date and Time, Last Time Edited/User, Facility, and Practitioner at the top. The next section beneath can have a tile entitled Session (with Date), which has columns that state: Symptoms, Conditions, Medications, Bloodwork Test Results, Scans, Genetic Testing, Other Lab Test, and Pictures. Beneath the Table can be the Treatment Plan Document, 2 tables exist, the "Original" produced from the software, and if a new one is produced, the "Updated" from the practitioner. The next section may have a tile that lists "Notes" for that particular Session, Prior Sessions can be listed beneath one another. Columns can be renamed and reconfigured to extract and provide desired information that is entered within the system; it is done so by clicking on the column which is an editable field and re-entering a new column heading. The system understands and provides the desired data in the column.

Block 306 of FIG. 2.2 describes an option that the system asks, "what type of medical professional are you? What is your name?".

Block 307 of FIG. 2.2 describes that blank fields are provided below the question that can either be typed in or the microphone can be selected and the field can be entered with speech to text (but may be later pre-populated from prior selections that can be edited again).

Block 308 of FIG. 2.3 describes that the system should be linked to the medical records system to provide guidance to the medical professional.

Block 309 of FIG. 2.3 describes that the system asks, "what is the name of the patient that you will be seeing?".

Block 310 of FIG. 2.3 describes that the field may be populated from audio input when the practitioner asks the patient to recite their name, or it may be entered via text or by microphone by the practitioner. Then "save and continue" can be selected.

Block 311 of FIG. 2.3 describes that any of the patient's prior documents from the system can be retrieved at this time.

Block 312 of FIG. 2.4 is same as the block 110 of FIG. 1.3.

Block 313 of FIG. 2.4 describes that the system records the conversation between the provider and the patient and identifies symptoms from conversation.

Block 314 of FIG. 2.4 describes that in healthcare facilities/settings where no prior medical records exist, the system searches and cannot find any prior patient records and may simply recognize symptoms and medical condition from the conversation and compile hypothetical diagnoses into a list.

Block 315 of FIG. 2.4 describes that the camera icon can be used at any time to upload a picture of the affected area of the patient to aid the system in providing a diagnosis if needed.

Block 316 of FIG. 2.4 describes that for Healthcare practices with patient records: The system juxtaposes/uses AI to evaluate the symptoms and medical conditions with prior diagnoses from the patient's records in the medical records system (database).

Block 317 of FIG. 2.4 describes that the system produces the list, and the bottom of the screen can be expanded and may listen to determine if additional tests are pending; and it may state some diagnoses will depend on specific results from tests that are in progress.

Block 318 of FIG. 2.5 describes that if no additional testing is needed at the moment, the system may not wait and produce potential conditions and recommendations for treatment and follow-up.

Block 319 of FIG. 2.5 describes that there may be a "Wait" option button so the session can be suspended and may wait for input of test results. The system may revert to the screen with all sessions. When the test results come in, the patient line item may turn orange (or designated user preference color) to alert to new results and the system may reconfigure a list for the patient to provide a diagnosis, treatment plan, and recommendations.

Block 320 of FIG. 2.5 describes that a Physician Desk Reference, Medical Encyclopedia, or optional purchased Medical reference can be the databases that the system can access to provide user guidance (i.e., change of dosage, change of medication, tests required) based on input provided from the session. Or AI/databases can be employed.

Block 321 of FIG. 2.5 describes that the system can alert the provider that a medication which the patient is currently taking may be causing an adverse effect or if medications are causing a synergistic affect, either together or with a contributing condition.

Block 322 of FIG. 2.5 describes that the system can determine if a medication the doctor is prescribing may cause issues with a current or potential condition (or allergy) or disease, or medications they are taking.

Block 323 of FIG. 2.7 describes that the system verifies the Physician's Desk Reference and Medical Encyclopedia (or whichever reference option) to provide a probable diagnosis/diagnoses based on patient records (conditions, medication, prior illnesses, and lab results/scans) and the current conversation.

Block 324 of FIG. 2.6 describes that another version includes a training mode with the medical professional sitting in on a medical visit, and the system will do much of the same except ask questions pertaining to what condition the patient could have and what treatments should be implemented. The trainee can access the applicable Medical Reference, and "Save" Diagnoses and Corresponding Medical Treatment. The system can provide feedback on their selections as potential outcomes and determine if they are appropriate actions or not and provide a report. Other Medical References can be purchased and used in place of the ones listed here to aid different specialized medical professionals.

Block 325 of FIG. 2.6 describes that the system can identify if certain laboratory tests and scans should or should not be recommended based on patient history and an explanation is provided as to why at this time.

Block 326 of FIG. 2.6 describes that the patient's genetic testing and family history may also be considered for treatment recommendations from the system.

Block 327 of FIG. 2.7 describes that the system provides a list of possible illnesses and conditions and makes treatment recommendations, i.e., for either medication or laboratory testing and scans that are needed in a roll up list.

Block 328 of FIG. 2.7 describes that the user can select "Read More" on the left side of the screen to access the medical reference guide for each possible diagnosis.

Block 329 of FIG. 2.7 describes that the user can also swipe up to reveal a hidden menu and select the "Reference Guide" and a blank field may pop up that may allow the user to type a keyword and read/have the system read to them about any other information at this time. The user can select "done" to go back to the recommended treatments.

Block 330 of FIG. 2.7 describes that the user can select another diagnosis/treatment and save it to the system when the user selects "Save as Diagnosis" before selecting "done" in the "Reference Guide". The user can select "done" to exit.

Block 331 of FIG. 2.8 describes that the user selects the option that best fits the needs of the patient and selects save or the system listens and selects it.

Block 332 of FIG. 2.8 describes that the user can select "Reorganize" from the list, and when this happens, the user can move the line items up and down. The old list is kept on this page from the system's prioritize list and is a tab at the top that can be switched from "Original" to "Updated".

Block 333 of FIG. 2.8 describes that if a diagnosis with corresponding medication/treatment plan is chosen that differs from the list that the software generates, the user is prompted to fill in the field (by typing or speaking) for "Reason for Substitution" on the "Original" tab per line item.

Block 334 of FIG. 2.9 describes that the file may be saved to the patient's medical record with all potential diagnoses that were not selected.

Block 335 of FIG. 2.9 describes that if the user decides to utilize a different care plan (the system accesses Physician's Desk Reference (or applicable medical reference) and juxtaposes the user's chosen medical care plan) and if there is a potential for adverse reactions for the patient, the system may have a message to pop up that states that potential adverse issue. This message may be posted to and saved (once the user saves the session) and it may be recorded as part of the patient's medical records.

Block 336 of FIG. 2.10 describes that the system may ask if the practitioner would like to enter notes/dictation.

Block 337 of FIG. 2.10 describes that the system may provide a "Yes" or "No" option to select. "No" may take them to the end screen.

Block 338 of FIG. 2.10 describes that the "Yes" option may provide options for a microphone to speak to the system, or a page icon that can be selected to type. Dictation can be compiled into the notes. An option at the bottom may be to "read aloud" if desired.

Block 339 of FIG. 2.10 describes that the bottom of the screen may have the options of "Back" and "Save & Continue" buttons.

Block 340 of FIG. 2.11 describes that the present invention is not only for a stand-alone medical practice, but an organizational version is another option that can interconnect different practices by patient accounts so that different medical professionals can review their patient's other practitioner's office visits so that they can all be on the same page for the patient's holistic treatment plan. However, AI will also review the visits and determine if there is conflicting treatment plans or if a diagnosis/treatment may be overlooked. In the event that a conflicting treatment plan that can cause serious injury/illness is identified, an alert may be posted at the bottom of any software page. Trends amongst similar patients' conditions (and their prognosis over time) and doctor's treatments and recommendations can be analyzed and reported, as well as any other data that is in the system.

Block 341 of FIG. 2.11 describes that the software may say thank you for using the Interactive Medical Reference System, have a good day, and close out.

Block 342 of FIG. 2.11 describes that sessions are listed on the "Home" page and can be reassessed for review, updated for treatment plans and dictation additions.

Block 343 of FIG. 2.12 describes a self-service option can be included for patients to be able to see their records under their name and each doctor visit is listed in whichever order they choose, i.e., by date or physician. The patient can request "Impromptu Visit" to be assessed by AI. Impromptu visits can be restricted for only specific conditions (UTIs, Strep, COVID, the Flu, Pregnancy, i.e., where an order can be created for a simple lab test to simply diagnose) and the Application Screen will list a disclaimer of what an Impromptu visit is permitted to encompass. The applicable physician(s) are alerted, and based upon symptoms AI can produce a diagnosis and treatment plan, which can be reviewed and approved by a medical professional. The AI system can create a lab order if needed (that can also be approved by a medical professional), that can either be sent to the lab associated with the medical practice or organization, or it can downloaded/printed for the patient to take elsewhere. Once test results are available, AI can produce a diagnosis and prescribe a medication (based on the patient medical records to prevent a synergistic affect that could occur based on other current medications or conditions or potential allergic reaction), upon approval by a medical professional. The system may be set up to require medical professional review/authorization before AI recommendations are sent to the patient.

Block 344 of FIG. 2.12 describes if a Review is made, there may be a date/time stamp and will not continue until the user enters/speaks their name.

Block 345 of FIG. 2.12 describes if any changes to a Treatment Plan is made, a date/time stamp may be created and will not continue until the user enters/speaks their name for the editable field.

Block 346 of FIG. 2.13 describes that patients can use the App to report updates about their health. AI can provide a list of diagnoses associated with a condition(s) or potential other condition(s) or side effects from medication(s) or interaction thereof. The App/software will be able to provide the following for Patients/Providers: View/download/transmit patient health data. Book/cancel appointments. Request refills. View clinician notes and lab test results. Exchange messages with healthcare professionals. Complete pre-visit health history information. Look up health information related to health concerns, results, and prescriptions. Bill Pay with credit card services/provide payment plan options. Review insurance claims. Send free text/voicemail/phone call reminders to patients. 24/365 call center patient support. Can invite people to view their medical information. Can upload documents for patient history. Integration w/EHRS, labs, pharmacies, and EMR systems. Can integrate/compatible w/3rd party apps, but not limited to: FitBit, Google Analytics, and Facebook, etc. So patient demographics can be tracked and integrated into the platform for further analysis/analytics/reports 16-Convert existing forms. Healthcare professionals can manage clinic notes/Patients can view them. Can use 2 factor authenticator or biometrics to access information. Prescription information includes medication name, dose, date filled, patient information, and refills. Virtual visit capable, can record and keep sessions, and make transcripts. Generates interactive reports and visualizations to gather performance metrics and potential outcomes for clinicians or AI to make fact-based decisions Users can analyze using drill down and pivot functionality. Can act like a ChatGPT. This software can encompass any or all these options presented in this diagram and can be a' la carte for the user so it can be added on to their existing patient portal/app software. Data reports can be custom configured to be produced at the user's discretion.

Block 347 of FIG. 2.13 describes that once the user selects "Save", the session entry may return back to the home screen of sessions.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Figure 3:
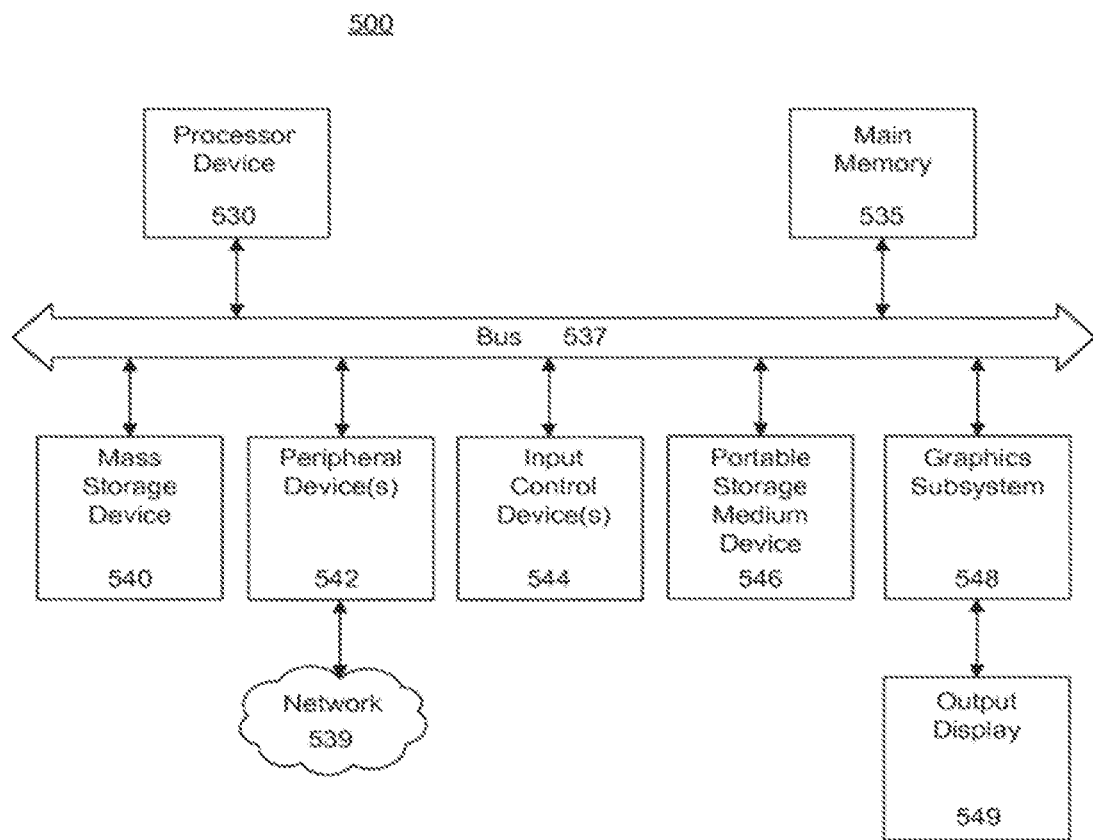
FIG. 3 is a block diagram of a general and/or special purpose computer 500, which may be a general and/or special purpose computing device, according to some example embodiments of the invention.

FIG. 3 is a block diagram of a general and/or special purpose computer 500, which may be a general and/or special purpose computing device, in accordance with some of the example embodiments of the invention. The computer 500 may be implemented as a conventional computer system, an embedded controller, a laptop, a server, a mobile device, a smartphone, a wearable computer, a set-top box, a kiosk, a vehicular information system, one more processors associated with a device, a customized machine, any other hardware platform, or any combination or multiplicity thereof.

Computer 500 may be a distributed system configured to function using multiple computing machines interconnected via a data network or bus system.

Computer 500 may include without limitation a processor 530, a graphics processing unit (GPU), Application Specific Integrated Circuit (ASIC), or any combination thereof. Computer 500 may also include a main memory 535, and an interconnect bus 537. The processor 530 may include without limitation a single microprocessor or may include a plurality of microprocessors for configuring the computer 500 as a multi-processor system.

Processor 530 may be configured to execute code or instructions to perform the operations and functionality described herein, manage request flow and address mappings, and to perform calculations and generate commands. Processor 530 may be configured to monitor and control the operation of the components in computer 500. Processor 530 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof.

Processor 530 may be a single processing unit, multiple processing units, a single processing core, multiple processing cores, special purpose processing cores, co-processors, or any combination thereof. According to certain embodiments, processor 530 along with other components of computer 500 may be a virtualized computing machine executing within one or more other computing machines.

The main memory 535 stores, among other things, instructions and/or data for execution by the processor 530. The main memory 535 may include banks of dynamic random-access memory (DRAM), as well as cache memory.

The computer 500 may further include a mass storage device(s) 540, peripheral device(s) 542, non-transitory storage medium device(s) 546, input control device(s) 544, a graphics subsystem 548, and/or a display 549. For explanatory purposes, all components in computer 500 are shown in FIG. 3 as being coupled through bus 537. However, computer 500 is not so limited. Devices and systems of the computer 500 may be coupled through one or more data transport means. For example, processor 530 and/or the main memory 535 may be coupled through a local microprocessor bus.

Mass storage 540, peripheral device(s) 542, portable storage medium device(s) 546, and/or graphics subsystem 548 may be coupled via one or more input/output (I/O) buses.

Mass storage 540 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof.

Mass storage 540 may store one or more operating systems, application programs and program modules, data, or any other information. Mass storage may be part of, or connected to, computer 500. Mass storage 540 may also be part of one or more other computing machines that are in communication with computer 500, such as servers, database servers, cloud storage, network attached storage, and so forth.

Portable storage medium device 546 operates in conjunction with a nonvolatile portable storage medium, such as, for example, a compact disc read only memory (CD-ROM), to input and output data and code to and from computer 500. In some embodiments, the software for storing information may be stored on a portable storage medium and may be inputted into computer 500 via portable storage medium device 546.

Peripheral device(s) 542 may include any type of computer support device, such as, for example, an input/output (I/O) interface configured to add additional functionality to computer 500. For example, peripheral device(s) 542 may include a network interface card for interfacing computer 500 with network 539.

Input control device(s) 544 provides a portion of the user interface for a user of computer 500. Input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. To display textual and graphical information, computer 500 may include graphics subsystem 548 and output display 549. Output display 549 may include a cathode ray tube (CRT) display and/or a liquid crystal display (LCD). Graphics subsystem 548 receives textual and graphical information and processes the information for output-to-output display 549.

Computer 500 may operate in a networked environment using logical connections through network 539 to one or more other systems or computing machines across network 539. Network 539 may include wide area networks (WAN), local area networks (LAN), intranets, the Internet, wireless access networks, wired networks, mobile networks, telephone networks, optical networks, or combinations thereof.

Network 539 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

Each component of computer 500 may represent a broad category of a computer component of a general and/or special purpose computer. Components of computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any software configuration. They may find applicability in any computing or processing environment. The terms "computer-readable", "machine-accessible medium" or "machine-readable medium" used herein shall include any medium that is configured for storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding (instructions) may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures, methods, processes, algorithms, and models described above.

The above-disclosed embodiments have been presented for the purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence or combined into a single step/process. The scope of the claims is intended to broadly cover the disclosed embodiments and any such modification.

This invention is susceptible to considerable variation within the spirit and scope of the appended claims.

The claimed invention is:

1. A system comprising:
a transceiver configured to receive information associated with a facility/practice; and
a processor communicatively coupled to the transceiver, wherein the processor is configured to:
obtain the information associated with the facility from the transceiver;
provide a user interface displaying an interactive platform to train users, wherein the user interface interacts with the processor;
provide a selection module configured to display, on the user interface, a menu of selectable industries associated with the facility;
provide a survey module configured, upon selection of a selected industry via the user interface, to display on the user interface a series of hazard questions based on the selected industry;
provide an interactive standard module configured, upon selection thereof via the user interface, to activate a dosimeter sensor operatively associated with the processor to capture a radiation reading of an area associated with the facility;
wherein the interactive standard module saves the captured radiation reading to a standards database so as to determine a probability of a hazard/diagnosis based on pre-loaded industry data associated with the selected industry and the information associated with the facility comprising the captured radiation reading; and
generate a hazard/medical report based on the probability of the hazard/diagnosis in the facility/practice, wherein the probability cannot be deleted or edited from the hazard/medical report by any of the users.

2. The system of claim 1, wherein the information associated with the facility comprises at least one of a video footage of the facility and images of the facility.

3. The system of claim 1, wherein the processor is configured to:
identify hazardous equipment, conditions, work practices and substances based on the pre-loaded industry data associated with the selected industry and the information associated with the facility;

determine hazard type associated with the hazardous equipment, conditions, work practices, and substances responsive to identifying the hazardous equipment, conditions, work practices, and substances; and determine the probability of the hazard/diagnosis responsive to determination of the hazard type.

4. The system of claim 3, wherein the processor is further configured to provide recommendation for remediation responsive in determination of the probability of the hazard/diagnosis in the facility.

5. The system of claim 1, wherein the processor is configured to output real-time notification to a user to obtain the information associated with the facility.

6. The system of claim 1, wherein the interactive standard module is configured, upon selection thereof via the user interface, to activate a sound level meter operatively associated with the processor to capture a sound level of the area associated with the facility;

wherein the interactive standard module saves the captured sound level to the standards database; and wherein the information associated with the facility further comprises the captured sound level.

7. The system of claim 6, wherein the information associated with the facility comprises the captured sound level.

8. The system of claim 6, wherein the interactive standard module is configured, upon selection thereof via the user interface, to activate a camera operatively associated with the processor to capture at least one image of the area associated with the facility;

wherein the interactive standard module saves the at least one captured image to the standards database; and wherein the information associated with the facility further comprises the at least one captured image.

9. The system of claim 1, wherein the system the captured radiation reading measures ionizing radiation.

10. The system of claim 1, wherein the system the captured radiation reading measures non-ionizing radiation.

11. The system of claim 1, wherein the information associated with the facility further comprises an air quality measurement in the facility and ventilation information of the facility.

12. The system of claim 1, wherein a user comprises a non-human entity.

13. The system of claim 1, wherein the system serves as a subject matter expert.

14. The system of claim 1, wherein the system determines the probability of the hazard/diagnosis by way of artificial intelligence.

* * * * *